United States Patent
Suresh et al.

(10) Patent No.: US 12,077,428 B2
(45) Date of Patent: Sep. 3, 2024

(54) MULTIAXIAL STRAIN ENGINEERING OF DEFECT DOPED MATERIALS

(71) Applicants: Massachusetts Institute of Technology, Cambridge, MA (US); Nanyang Technological University, Singapore (SG)

(72) Inventors: Subra Suresh, Singapore (SG); Ming Dao, West Roxbury, MA (US); Ju Li, Weston, MA (US); Zhe Shi, Cambridge, MA (US)

(73) Assignees: Massachusetts Institute of Technology, Cambridge, MA (US); Nanyang Technological University, Singapore (SG)

( * ) Notice: Subject to any disclaimer, the term of this patent is extended or adjusted under 35 U.S.C. 154(b) by 438 days.

(21) Appl. No.: 17/411,707

(22) Filed: Aug. 25, 2021

(65) Prior Publication Data
US 2022/0063986 A1    Mar. 3, 2022

Related U.S. Application Data

(60) Provisional application No. 63/070,913, filed on Aug. 27, 2020.

(51) Int. Cl.
*B81B 3/00* (2006.01)
*G06F 30/27* (2020.01)
*G06F 111/10* (2020.01)

(52) U.S. Cl.
CPC ............ *B81B 3/0062* (2013.01); *G06F 30/27* (2020.01); *B81B 2201/018* (2013.01); *B81B 2203/0118* (2013.01); *B81B 2203/051* (2013.01); *B81B 2203/053* (2013.01); *B81B 2203/056* (2013.01); *G06F 2111/10* (2020.01)

(58) Field of Classification Search
CPC ........ H01L 29/045; H01L 29/36; H01L 29/84
See application file for complete search history.

(56) References Cited

U.S. PATENT DOCUMENTS

| 6,652,968 | B1 * | 11/2003 | Miller .................. H01B 1/22 428/407 |
| 2006/0159722 | A1 * | 7/2006 | Braithwaite ............ B29C 41/22 424/443 |
| 2016/0381789 | A1 | 12/2016 | Rogers et al. |
| 2017/0343695 | A1 | 11/2017 | Stetson et al. |
| 2018/0331073 | A1 | 11/2018 | Sekar et al. |

FOREIGN PATENT DOCUMENTS

WO    WO 2020/076519 A1    4/2020

OTHER PUBLICATIONS

U.S. Appl. No. 17/411,748, filed Aug. 25, 2021, Suresh et al.
PCT/US2021/047538, Dec. 8, 2021, International Search Report and Written Opinion.
International Search Report and Written Opinion mailed Dec. 8, 2021, for Application No. PCT/US2021/047538.

(Continued)

*Primary Examiner* — Moazzam Hossain
(74) *Attorney, Agent, or Firm* — Wolf, Greenfield & Sacks, P.C.

(57) ABSTRACT

Compositions and methods related to multiaxially straining defect doped materials as well as their use in electrical circuits are generally described.

14 Claims, 16 Drawing Sheets

(56) References Cited

OTHER PUBLICATIONS

[No Author Listed], Profile of Subra Suresh, Proc Natl Acad Sci. Oct. 2020; 117(41):25192-4.
Banerjee et al., Ultralarge elastic deformation of nanoscale diamond. Science. Apr. 20, 2018;360(6386):300-302.
Dang et al., Achieving large uniform tensile elasticity in microfabricated diamond. Science. Jan. 1, 2021;371(6524):76-78.
Nie et al., Approaching diamond's theoretical elasticity and strength limits. Nat Commun. 2019;10: 1-7.
Nie et al., Direct observation of room-temperature dislocation plasticity in diamond. Matter. 2020; 2: 1222-32.
Shi et al., Metallization of diamond. Proc Natl Acad Sci U S A. Oct. 6, 2020;117(40):24634-24639.

\* cited by examiner

MULTIAXIAL STRAIN ENGINEERING OF DEFECT DOPED MATERIALS

CROSS-REFERENCE TO RELATED APPLICATIONS

This application claims the benefit under 35 U.S.C. § 119(e) of U.S. provisional application Ser. No. 63/070,913, filed Aug. 27, 2020, the disclosure of which is incorporated by reference in its entirety.

GOVERNMENT FUNDING

This invention was made with Government support under Grant No. N00014-18-1-2497 awarded by the Office of Naval Research. The Government has certain rights in the invention.

FIELD

Compositions and methods related to multiaxially straining defect doped materials are generally described.

BACKGROUND

A material with an electronic bandgap much greater than its thermal fluctuation energy will often not have enough charge carriers (e.g., electrons and/or holes) to function as a semiconducting material. Instead, to function, the material may include defects with additional localized electronic states whose energies are inside the electronic bandgap of the material, but proximate to the edges of the conduction band minimum and/or the valence band maximum. If the energy difference between the localized electronic states of the defect and either the conduction band minimum or the valence band maximum is sufficiently small, then it is possible for the defects to be ionized by thermal fluctuation energy. In such cases, a localized electron around the defect either: (i) makes a transition from the aforementioned localized electronic state to the delocalized conduction band state (n-doping); or (ii) captures a delocalized valence band electron and becomes the localized electronic state, thereby creating a delocalized hole in the valence band (p-doping). When the energy difference is large, however, thermal fluctuation energy at room temperature may not be sufficient to ionize a defect to form charge carriers.

SUMMARY

Compositions and methods related to multiaxially straining defect doped materials as well as their methods of use in electrical circuits are generally described.

In one aspect, an electrical device is provided. In some embodiments, the electrical device comprises: a defect doped material forming at least a portion of an electrical circuit; and one or more actuators configured to selectively apply a multiaxial strain to at least a first portion of the defect doped material, wherein the defect doped material is a non-conducting material when the defect doped material is in an unstrained state, and wherein at least a second portion of the defect doped material is a semiconducting material or a conducting material when the one or more actuators apply the multiaxial strain to the defect doped material in a strained state.

In another aspect, a method of controlling a conductive state of a defect doped material is provided. According to certain embodiments, the method of controlling a conductive state of a defect doped material comprises: applying a multiaxial strain to at least a first portion of the defect doped material; and transitioning at least a second portion of the defect doped material from a non-conductive material to a semiconducting material or a conducting material.

In yet another aspect, a composition is provided. In some embodiments, the composition comprises: a defect doped material, wherein a multiaxial strain is applied to at least a first portion of the defect doped material in a strained state, wherein the defect doped material is a non-conducting material when the defect doped material is in an unstrained state, and wherein at least a second portion of the defect doped material is a semiconducting material or a conducting material when the multiaxial strain is applied to the defect doped material.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
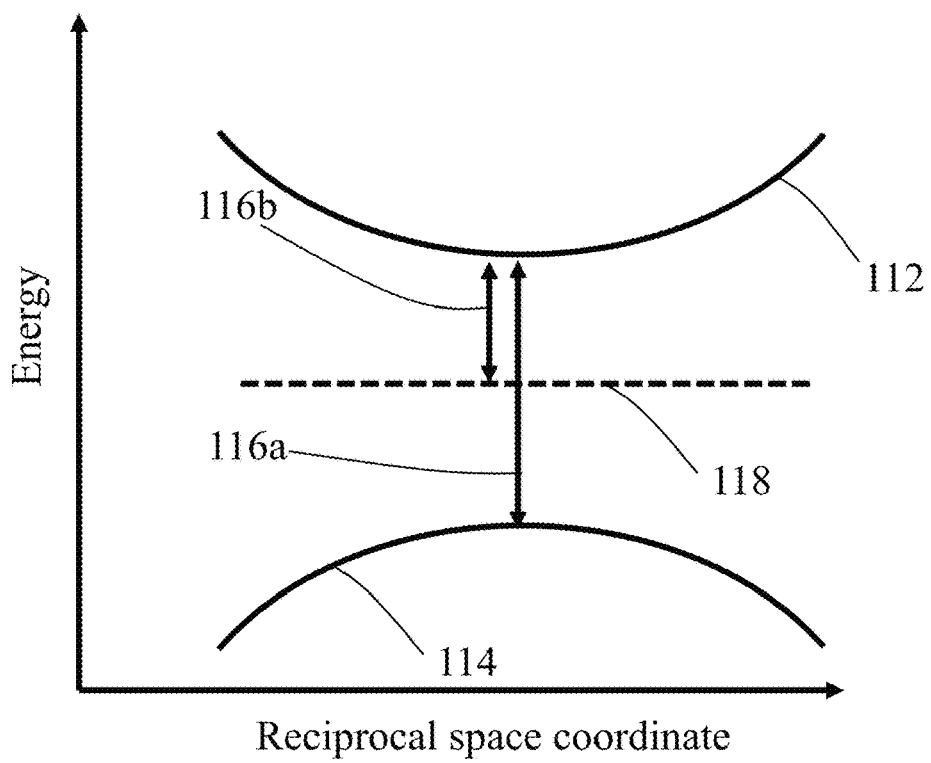
FIG. 1A is, according to some embodiments, a schematic representation of a conventional change in energy difference between a localized electronic state of a defect and an excited electronic state of a defect, according to certain embodiments.

Materials with a wide electronic bandgap often do not have enough charge carriers (e.g., holes and/or electrons) in order to function as semiconducting or conducting materials. For example, the implementation of diamond, an ultra-wide electronic bandgap material, as a semiconducting or conducting material has conventionally been unsuccessful due to the difficulty in effectively doping the material with a defect capable of producing electrons (e.g., a n-type dopant). In some materials, a substitutional defect in the material may spontaneously break symmetry from one or more localized electronic states to one or more non-degenerate low-symmetry variant electronic states. Such a spontaneous break in symmetry results in a material with a deep dopant state that has an energy far below (e.g., greater than or equal to 1 eV below) the conduction band edge or above the valence band edge. The energy of activation to ionize a defect in a deep dopant state is too large to be facilitated by room-temperature thermal fluctuations. Furthermore, depending on the choice of defect, the energy of activation of the defect to overcome the energy gap from the one or more localized electronic states to either the conduction band edge or the valence band edge can vary greatly within the same material. In a material comprising diamond, for instance, the energy of activation of a p-type dopant can differ by approximately 200 meV from the energy of activation of an n-type dopant. As a result, a defect in a deep dopant state typically does not contribute charge carriers to the conduction band and/or valence band, resulting in a material that is incapable of being used in a semiconducting or conducting device. Thus, the Inventors have recognized a need for methods and systems to further alter the properties of wide electronic bandgap materials to facilitate their use in a semiconducting and/or conducting device.

In view of the above, the Inventors have realized and appreciated that elastic strain can be used to control the doping level in a defect doped material. In certain embodiments, a defect transitions from a deep dopant state to a shallow dopant state upon the application of an elastic strain. For example, as strain is applied to the defect doped material, the transition of a defect from a deep dopant state to a shallow dopant state may occur due to a decrease in the energy of activation to ionize a defect to form a plurality of charge carriers. Further, the application of elastic strain may be used to dynamically toggle the defect between a shallow dopant state and a deep dopant state rapidly and/or reversibly, akin to an "on-off" switch. Resultantly, a non-conducting defect doped material with a large activation energy may transition to a semiconducting material or a conducting material with a lower activation energy to ionize the defects upon the application of an elastic strain. Furthermore, the compositions and methods described herein can be used to effectively n-dope and/or p-dope a material that was previously considered to be "undopable," such that the material defects may transition from a deep dopant state to a previously inaccessible shallow dopant state upon the application of elastic strain. In addition to semiconducting and/or conducting devices, the defect doped materials may be implemented in a memory device, due to the ability to dynamically toggle the defect doped material between these states.

Further, the Inventors have recognized, in the context of the present disclosure, that the use of complex strain states (e.g., strain states giving rise to multiaxial and/or spatially varying strain) can have several advantages over uniformly or uniaxially applied strain. For example, in some embodiments, multiaxial strains can give rise to unique electron energy band structures. Furthermore, multiaxial strain may be applied to a material (e.g., a defect doped material) to produce spatially varying strain, and thus electronic properties that spatially vary within the material. This may result in the transition of a portion of the material to a semiconducting or metallic state while. In this way, electron conduction may be allowed through the portion of a material, while barring electron conduction through another portion of the material that is still in the non-conducting state in some embodiments. Thus, spatial variation in strain within the material may be used to direct electron conduction through a desired portion of the material, in some embodiments.

In one aspect, an electrical device is provided. The electrical device may comprise an electrical circuit and a material (e.g., a defect doped material, as described in greater detail below). According to certain embodiments, the electrical device is configured such that application of a strain (e.g., a multiaxial strain, as described in greater detail below) to the material (e.g., the defect doped material) causes at least a portion of the material to transition to a conducting or a semiconducting state. In some embodiments, for example, application of the strain to a defect doped material may result in a transition from a deep doping state to a shallow doping state, allowing electron and/or hole conduction. However, even application of the strain to a non defect doped material may, in some embodiments, result in a transition to a conducting or semiconducting state, due to stress-driven changes to an electronic band structure of the defect doped material. In some embodiments, the electrical device comprises one or more actuators. The actuators may be configured to selectively apply a multiaxial strain (e.g., to the material). For example, in some embodiments, the one or more actuators are configured to selectively apply a multi-axial strain to at least a first portion of the material (e.g., defect doped material).

In another aspect, a composition comprising a defect doped material is provided. In a conventional defect doped material, the ionization of defects leads to the formation of one or more charge carriers (e.g., electrons and/or holes). For example, in some cases, a defect may have one or more localized electronic states that are within an electronic bandgap and proximate to the conduction band minimum and/or valence band maximum. The smaller the energy gap between the localized electronic states and the conduction band minimum and/or valence band maximum, the less energy is used to ionize the defects by thermal fluctuation energy at room temperature. Examples of these principles are described in greater detail below, with reference to FIG. 1A. In some embodiments, a defect doped material is a non-conducting material when the defect doped material is in an unstrained state. In some embodiments, multiaxial strain is applied to the defect doped material comprised by the composition.

Applying an elastic strain to the material may either shift the electronic band structure and/or the energy states of the material defects. This is described in greater detail below, with reference to FIG. 1B. Of course, embodiments in which one or more of the conduction band, valence band, and/or energy state of the defects change relative spacing, change shape, and/or change corresponding maxima and minima to reduce an associated activation energy to ionize the defects are also contemplated. Thus, the application of an elastic strain to a material may cause a defect in a material to transition into an excited electronic state (e.g., shallow dopant state) such that the activation energy to ionize the defect to a conduction band edge and/or valence band edge is less than an activation energy of the defect in the unstrained state. Accordingly, in the various embodiments disclosed herein, the conducting state of a defect doped material can be controlled by the application of strain to the defect doped material, such that the defect doped material may transition from a non-conducting material to a semi-conducting material or a conducting material upon the application of strain due to the decrease in the activation energy used to ionize the defects in the strained state relative to the unstrained state of the material.

According to certain embodiments, the amount of elastic strain that is applied to a defect doped material to transition the material into a desired conductive state is any of a variety of suitable amounts. In certain embodiments, a strain is applied to a defect doped material in an amount between or equal to 1% and 25%. For example, in some embodiments, the elastic strain applied to the defect doped material is greater than or equal to 0.5%, 1%, 5%, 10%, 15%, and/or any other appropriate amount of strain. In certain embodiments, the elastic strain is applied to the defect doped material in an amount less than or equal to 25%, 20%, 15%, 10%, 5%, 1%, and/or any other appropriate amount of strain. Combinations of the above recited ranges are also possible (e.g., the elastic strain may be applied to the defect doped material in an amount between or equal to 1% and 25%, 1% and 15%, 5% and 10%, and/or any other appropriate range including ranges both greater than and less than those noted above. It should be understood that these elastic strain ranges may correspond to either compressive strains, tensile strains, shear strains, and/or combinations of the forgoing such that uniaxial, biaxial, and/or multiaxial elastic strains may be applied to the disclosed materials. A variety of suitable methods of applying strain are further described in detail below.

In some embodiments, a defect doped material is subject to multiaxial strain, as described in greater detail elsewhere herein. For example, a method may comprise applying a multiaxial strain to at least a first portion of the defect doped material. Application of the multiaxial strain to the first portion of the defect doped material may place the defect doped material in a strained state. In some embodiments, the application of the multiaxial strain to the first portion of the material can cause at least a second portion of the defect doped material to transition to a semiconducting or conducting state. Thus, in some embodiments, a method comprises transitioning at least a second portion of the defect doped material from a non-conducting material to a semiconducting material or a conducting material. According to some embodiments, the second portion of the defect doped material is a semiconducting material when the multiaxial strain is applied to the defect doped material. In some embodiments, the second portion of the defect doped material is a conducting material when the multiaxial strain is applied to the defect doped material. In some instances, the first portion of the material may remain in a non-conducting state. However, in some embodiments, the first portion may also transition to a conducting or semi-conducting state. As an example, one or more actuators may be used to apply multiaxial strain to the defect doped material, as described in greater detail below, producing a strained state wherein the second portion of the defect doped material is a semi-conducting material or a conducting material.

The first portion of the defect doped material, in some embodiments, comprises greater than or equal to 0.05%, greater than or equal to 1%, greater than or equal to 5%, greater than or equal to 10%, greater than or equal to 25%, greater than or equal to 50%, greater than or equal to 75%, or more of the defect doped material. In some embodiments, the first portion of the defect doped material comprises less than or equal to 100%, less than or equal to 99%, less than or equal to 95%, less than or equal to 90%, less than or equal to 75%, less than or equal to 50%, less than or equal to 25%, less than or equal to 10%, less than or equal to 5%, or less of the defect doped material. Combinations of these ranges are possible. For example, in some embodiments, the first portion of the defect doped material comprises greater than or equal to 0.05% and less than or equal to 100% of the defect doped material.

The second portion of the defect doped material, in some embodiments, comprises greater than or equal to 0.05%, greater than or equal to 1%, greater than or equal to 5%, greater than or equal to 10%, greater than or equal to 25%, greater than or equal to 50%, greater than or equal to 75%, or more of the defect doped material. In some embodiments, the second portion of the defect doped material comprises less than or equal to 100%, less than or equal to 99%, less than or equal to 95%, less than or equal to 90%, less than or equal to 75%, less than or equal to 50%, less than or equal to 25%, less than or equal to 10%, less than or equal to 5%, or less of the defect doped material. Combinations of these ranges are possible. For example, in some embodiments, the second portion of the defect doped material comprises greater than or equal to 0.05% and less than or equal to 100% of the defect doped material.

The second portion of the defect doped material may overlap with the first portion of the defect doped material in some embodiments. For example, the first portion of the defect doped material may comprise a second portion of the defect doped material. In some embodiments, the first portion of the defect doped material is the second portion of the defect doped material. In some embodiments, the defect doped material further comprises a third portion of the defect doped material. The third portion of the defect doped material may be a nonconducting portion of the defect doped material, even in a strained state. Of course, it should be understood that the relative geometry and size of the second portion of the defect doped material and the third portion of the defect doped material may vary as a result of situational specifics. For example, the relative geometry and size of the second portion of the defect doped material and the third portion of the defect doped material may depend on a magnitude and number of externally-applied mechanical forces acting on the defect doped material, as described in greater detail elsewhere herein.

In some embodiments, an electrical circuit (as described in greater detail elsewhere herein) is configured to transmit current from a first electrode connected to the defect doped material to a second electrode connected to the defect doped material through the second portion of the defect doped material when the defect doped material is selectively strained by the one or more actuators. According to some embodiments, a method further comprises removing the multiaxial stress and/or the multiaxial strain from the first portion of the defect doped material. Relatedly, in some embodiments, a method further comprises transitioning the second portion of the defect doped material from the semiconducting material or the conducting material to the nonconducting material. Thus, in some embodiments, the electrical circuit is configured to transmit a current through the second portion of the defect doped material when the second portion of the defect doped material is in the strained state, without transmitting the electrical current through the second portion of the defect doped material when the second portion of the defect doped material is in the unstrained state.

In certain aspects, a material may comprise a defect (e.g., a dopant). The defect may have the ability to be ionized into a charge carrier, such as an electron or a hole. The defects may be introduced into the material by methods understood by one of ordinary skill in the art. For instance, the defects may be implanted and/or grown in the material during deposition of the material and/or the defects may be formed after deposition of the material using conventional techniques. Possible methods include molecular beam epitaxy, chemical vapor deposition, and/or other appropriate techniques. The defects may be evenly dispersed throughout the defect doped material. However, in other embodiments, the defect doped material comprises defects unevenly dispersed throughout the defect doped material. For example, in some embodiments the defects are only present in one or more isolated regions of the defect doped material.

As described above, an activation energy may be associated with ionizing defects to form a plurality of charge carriers, such as electrons and/or holes. According to some embodiments, the activation energy to ionize the defects is an energy gap between one or more electronic states of the defect and the conduction band edge and/or valence band edge. In certain instances, when the defect doped material is in an unstrained state, the activation energy of a defect may be sufficiently large such that it will not be ionized by thermal fluctuations of the material at ordinary operating temperatures. In certain embodiments, such a large activation energy results in a defect doped material that is non-conducting due to the large energy differential between the one or more electronic states of the defect and either of the band edges.

In some embodiments, the activation energy to ionize a defect of a defect doped material to form a plurality of charge carriers in an unstrained state is greater than or equal to 1,000 meV when the defect doped material is in an unstrained state. For example, in some embodiments, the activation energy to ionize the defect is greater than or equal to 1,100 meV, greater than or equal to 1,200 meV, greater than or equal to 1,300 meV, greater than or equal to equal to 1,400 meV, or greater than or equal to 1,500 meV when the defect doped material is in an unstrained state. In certain embodiments, the activation energy to ionize the defect is less than or equal to 2,000 meV, less than or equal to 1,500 meV, less than or equal to 1,400 meV, less than or equal to 1,300 meV, less than or equal to 1,200 meV, or less than or equal to 1,100 meV when the defect doped material is in an unstrained state. Combinations of the above recited ranges are also possible (e.g., the activation energy to ionize the defect may be greater than or equal to 1,000 meV and less than or equal to 2,000 meV when the defect doped material is in an unstrained state, the activation energy to ionize the defect may be greater than or equal to 1,200 meV and less than or equal to 1,800 meV when the defect doped material is in an unstrained state). Of course defect energies in the unstrained state both greater and less than those noted above are also contemplated.

In some embodiments, an activation energy to ionize defects of the defect doped material in the strained state is less than the activation energy to ionize the defects when the defect doped material is in the unstrained state. According to some embodiments, the activation energy to ionize defects of a defect doped material to form a plurality of charge carriers is less than or equal to 200 meV when the defect doped material is in an elastically strained state. For example, in certain embodiments, the activation energy to ionize the defect is less than or equal to 150 meV, less than or equal to 100 meV, or less than or equal to 50 meV when the defect doped material is in a strained state. In some embodiments, the activation energy to ionize the defect is greater than or equal to 1 meV, greater than or equal to 50 meV, greater than or equal to 100 meV, or greater than or equal to 150 meV when the material is in a strained state. Combinations of the above recited ranges are also possible (e.g., the activation energy to ionize the defect may be less than or equal to 200 meV and greater than or equal to 1 meV when the defect doped material is in a strained state, the activation energy required to ionize the defect may be less than or equal to 150 meV and greater than or equal to 100 meV when the defect doped material is in a strained state). Of course embodiments in which the activation energy is either greater than or less than the range of activation energies noted above for a strained defect doped material are also contemplated as the disclosure is not so limited.

For the purposes of the various embodiments and examples described herein, a strain, strain coordinate, strain tensor, or other similar term may refer to a strain that has been applied to a material with three or more degrees of freedom including, for example three degrees of freedom (i.e., three-dimensional strain space), six degrees of freedom (i.e., six-dimensional strain space), and/or any other appropriate strain, strain tensor, or strain coordinate applied with any desired number of degrees of freedom. Additionally, these strains may also refer to elastic strains. For example, a shearless elastic strain may be applied using a three-dimensional strain tensor with three degrees of freedom while in another embodiment, due to the strain tensor being a symmetric matrix, non-redundant strains may be defined using six degrees of freedom resulting in what may be described as a six dimensional strain tensor. Accordingly, it should be understood that strains may be described relative to the disclosed embodiments using any appropriate strain with any appropriate number of degrees of freedom ranging from three degrees of freedom strain (three-dimensional strain) to six degrees of freedom strain (six-dimensional strain) as the disclosure is not limited in this fashion. Additional description of the strain tensor is included below, with reference to FIGS. 2A-2B.

As used herein, uniaxial strain refers to a strain state wherein strain can be represented by the strain tensor:

$$\begin{bmatrix} \varepsilon_{11} & 0 & 0 \\ 0 & 0 & 0 \\ 0 & 0 & 0 \end{bmatrix}$$

Another strain state is produced by an application of a uniaxial strain, as described in greater detail below. In some embodiments (i.e., in embodiments wherein a strained material is isotropic), the strain tensor under uniaxial stress can be represented by the strain tensor:

$$\begin{bmatrix} \varepsilon_A & 0 & 0 \\ 0 & \varepsilon_L & 0 \\ 0 & 0 & \varepsilon_L \end{bmatrix}$$

where $\varepsilon_A$ denotes a strain along an axis of applied stress, and $\varepsilon_L$ denotes a strain lateral to the axis of applied stress. Generally, in cases where neither the strain nor the stress is uniaxial, strain is referred to herein as multiaxial strain. As a non-limiting example, an isotropic material is under multiaxial strain if it can be represented by the strain tensor:

$$\begin{bmatrix} \varepsilon_{11} & 0 & 0 \\ 0 & \varepsilon_{22} & 0 \\ 0 & 0 & \varepsilon_{33} \end{bmatrix}$$

where no diagonal element (e.g., $\varepsilon_{11}$, $\varepsilon_{22}$, and $\varepsilon_{33}$) approximately equals another diagonal element. In some embodiments, a multiaxial strain state occurs under plane stress conditions. Plane stress conditions may be observed, for instance, during deformation of a thin body. Under plane stress, strain may be represented by the tensor:

$$\begin{bmatrix} \varepsilon_{11} & \varepsilon_{12} & 0 \\ \varepsilon_{12} & \varepsilon_{22} & 0 \\ 0 & 0 & \varepsilon_{33} \end{bmatrix}$$

where a direction 3 associated with the extensional strain element $\varepsilon_{33}$ is a direction along which no stress is applied. Another non-limiting example of a multiaxial strain state may occur under plane strain conditions. Plane strain conditions may be observed, for instance, during deformation of a body whose deformation is restricted in one dimension. Under plane strain, strain may be represented by the tensor:

$$\begin{bmatrix} \varepsilon_{11} & \varepsilon_{12} & 0 \\ \varepsilon_{12} & \varepsilon_{22} & 0 \\ 0 & 0 & 0 \end{bmatrix}$$

where a direction 3 associated with the extensional strain element $\varepsilon_{33}$ is the direction in which strain is restricted (causing $\varepsilon_{33}$ to equal zero). It should, of course, be understood that these are provided as non-limiting examples of multiaxial strain, and that in many cases (including cases described elsewhere herein) multiaxial strain may be more complex.

Depending on the embodiment, a strain state may be spatially uniform within at least a portion of a material (e.g., within a defect doped material). However, instances in which spatially non-uniform strain states are applied to a material, and/or a component comprising the material, are applied are also contemplated.

Multiaxial strains may be arbitrarily complex. In some embodiments, a multiaxial strain comprises at least three distinct nonzero strain tensor elements. For example, under plane stress conditions, the strain tensor comprises at least three distinct nonzero strain tensor elements, $\varepsilon_{11}$, $\varepsilon_{22}$, and $\varepsilon_{33}$. However, not all multiaxial strain conditions comprise at least three distinct nonzero strain tensor elements. For example, under plane strain conditions, in a coordinate system defined by the principal axes of strain, only two extensional strain elements (e.g., $\varepsilon_{11}$ and $\varepsilon_{22}$) are necessarily non-zero—however, the strain state is still multiaxial.

In some embodiments, a multiaxial strain state results from an application of one or more externally-applied mechanical forces to at least a portion of a material, such as a defect doped material. Externally-applied mechanical forces may be applied to the portion of the material (e.g., the defect doped material) via contact with the material. Examples of externally-applied mechanical forces as described herein include normal forces, shear forces, external pressure, and/or any other appropriate forces. In some embodiments, the multiaxial strain results from the application of two or more externally-applied forces. According to some embodiments, an actuator applies an externally-applied mechanical force to the material. An externally-applied mechanical force may also be applied to a portion of a defect doped material via a coupling between the portion of the defect doped material and an external body. For example, a coupling between the portion of a defect doped material and a substrate may apply an externally-applied mechanical force to the portion of the defect doped material (e.g., to resist a second, opposing externally-applied mechanical force acting on a second portion of the defect doped material).

In some embodiments, at least two externally-applied mechanical forces are applied to a component comprising a material where the forces are substantially non-parallel. For example, an angle between substantially non-parallel mechanical forces is, in some embodiments, greater than or equal to 10, greater than or equal to 2°, greater than or equal to 5°, greater than or equal to 10°, greater than or equal to 15°, greater than or equal to 20°, greater than or equal to 25°, greater than or equal to 30°, or greater. In some embodiments, an angle between substantially non-parallel mechanical forces is less than or equal to 179°, less than or equal to 178°, less than or equal to 175°, less than or equal to 170°, less than or equal to 165°, less than or equal to 160°, less than or equal to 155°, less than or equal to 150°, or less. Combinations of these ranges are possible. For example, in some embodiments, the angle between substantially non-parallel mechanical forces is greater than or equal to 1° and less than or equal to 179°.

In some embodiments, an externally-applied mechanical force is substantially parallel to a surface of the defect doped material to which it is applied such that the force may apply a shear force to the defect doped material. Alternatively, in some embodiments, an externally-applied mechanical force is substantially perpendicular to a surface of the defect doped material to which it is applied. Forces applied to the surfaces that are between these angles are also contemplated. As an example, an actuator configured to apply an externally-applied mechanical force to a defect doped material using an angled surface may apply an externally-applied mechanical force comprising both a friction component and a normal component, with the result that the externally-applied mechanical force is neither substantially parallel to nor substantially perpendicular to the surface of the defect doped material at which the externally-applied mechanical force is applied.

The strain applied to a material may be measured and/or calculated in a number of ways. For example, the elastic strains present in a material may be determined using finite element analysis, strain calculations using material geometries and applied deformations, strain calculations made using lattice mismatch considerations, and/or any other appropriate method as the disclosure is not limited to any particular method for evaluating the applied elastic strains.

For the purposes of the various embodiments and examples described herein, a stress, stress coordinate, stress tensor, or other similar term may refer to a stress that has been applied to a material with three or more degrees of freedom including, for example three degrees of freedom (i.e., three-dimensional stress space), six degrees of freedom (i.e., six-dimensional stress space), and/or any other appropriate stress, stress tensor, or stress coordinate applied with any desired number of degrees of freedom. Additionally, these stresses may also refer to elastic stresses. For example, a shearless elastic stress may be applied using a three-dimensional stress tensor with three degrees of freedom while in another embodiment due to the stress tensor being a symmetric matrix non-redundant stresses may be defined using six degrees of freedom resulting in what may be described as a six dimensional stress tensor. Accordingly, it should be understood that stresses may be described relative to the disclosed embodiments using any appropriate stress with any appropriate number of degrees of freedom ranging from three degrees of freedom stress (three-dimensional stress) to six degrees of freedom stress (six-dimensional stress) as the disclosure is not limited in this fashion.

As used herein, uniaxial stress refers to a stress state wherein stress can be represented by the stress tensor:

$$\begin{bmatrix} \sigma_{11} & 0 & 0 \\ 0 & 0 & 0 \\ 0 & 0 & 0 \end{bmatrix}$$

Generally, stress which is not uniaxial is referred to herein as multiaxial stress. As a non-limiting example, an isotropic material is under multiaxial stress if it can be represented by the stress tensor:

$$\begin{bmatrix} \sigma_{11} & 0 & 0 \\ 0 & \sigma_{22} & 0 \\ 0 & 0 & \sigma_{33} \end{bmatrix}$$

where no diagonal element (e.g., $\sigma_{11}$, $\sigma_{22}$, and $\sigma_{33}$) approximately equals another diagonal element. In some embodiments, a multiaxial stress state occurs under plane stress conditions. Plane stress conditions may be observed, for instance, during deformation of a thin body. Under plane stress, stress may be represented by the tensor:

$$\begin{bmatrix} \sigma_{11} & \sigma_{12} & 0 \\ \sigma_{12} & \sigma_{22} & 0 \\ 0 & 0 & 0 \end{bmatrix}$$

Another non-limiting example of a multiaxial stress state may occur under plane strain conditions. Plane strain conditions may be observed, for instance, during deformation of a body whose deformation is restricted in one dimension. Under plane strain, stress may be represented by the tensor:

$$\begin{bmatrix} \sigma_{11} & \sigma_{12} & 0 \\ \sigma_{12} & \sigma_{22} & 0 \\ 0 & 0 & \sigma_{33} \end{bmatrix}$$

where a direction 3 associated with the extensional stress element $\sigma_{33}$ is the direction in which strain is restricted. It should, of course, be understood that these are provided as non-limiting examples of multiaxial stress, and that in many cases (including cases described elsewhere herein) multiaxial stress may be more complex.

A stress state may be spatially uniform within at least a portion of a material (e.g., within a defect doped material). In some embodiments, a multiaxial stress is spatially uniform within at least a portion of a material. For example, in some embodiments, a thin sheet under plane stress conditions experiences spatially uniform stress throughout the body of the thin sheet. However, the application of non-uniform stress states within a material area also contemplated.

Multiaxial stresses may be arbitrarily complex. In some embodiments, a multiaxial stress comprises at least three distinct nonzero stress tensor elements. For example, under plane stress conditions, the stress tensor comprises at least three distinct nonzero stress tensor elements, $\sigma_{11}$, $\sigma_{22}$, and $\sigma_{33}$. However, not all multiaxial stress conditions comprise at least three distinct nonzero stress tensor elements. For example, under plane stress conditions, in a coordinate system defined by the principal axes of stress, only two extensional stress elements (e.g., $\sigma_{11}$ and $\sigma_{22}$) are necessarily non-zero—however, the stress state is still multiaxial.

In some embodiments, an actuator is configured to apply an externally-applied mechanical force to a material (e.g., a defect doped material). The application of an externally-applied mechanical force to the material may produce a stress and/or a strain within the material. In some embodiments, strain (e.g., multiaxial strain) is applied by one or more actuators. For example, in some embodiments the strain (e.g., multiaxial strain) is applied by exactly one actuator. According to certain embodiments, the strain (e.g., multiaxial strain) is applied by two or more actuators. Relatedly, in some embodiments, stress (e.g., multiaxial stress) is applied by one or more actuators. For example, in some embodiments the stress (e.g., multiaxial stress) is applied by exactly one actuator. According to certain embodiments, the stress (e.g., multiaxial stress) is applied by two or more actuators.

In some embodiments, the one or more actuators are configured to apply a multiaxial strain and/or multiaxial stress via translational motion of the one or more actuators. According to some embodiments, applying the multiaxial strain and/or multiaxial stress includes moving (e.g., translating) the one or more actuators in one or more directions. For example, in some embodiments, applying the multiaxial strain and/or multiaxial stress comprises translating a portion of the one or more actuators, and in some instances two or more actuators, associated with a material in a first direction and a second direction different from the first direction.

In some embodiments, an actuator is configured to apply a multiaxial strain and/or multiaxial stress via rotational motion of the one or more actuators (e.g., to place a material, such as a defect doped material, under torsion). In some embodiments, a first actuator is configured to apply a stress and/or a strain via rotational motion and a second actuator is configured to apply a stress and/or a strain via translational motion.

According to some embodiments, one or more actuators are microelectromechanical actuators. In some embodiments, one or more actuators are configured to selectively multiaxial the strain the defect doped material to at least a first multiaxial strain. For example, the one or more actuators may be configured to deform the material to a fixed position and hold where the applied deformation is held. In various embodiments, the one or more actuators are configured to apply and remove the strain in a cyclic fashion. For example, the one or more actuators may be configured to cyclically drive a transition between a n unstrained state of a material and a strained state of the material. Of course, other types of actuators may also be used.

In some embodiments, multiaxial stress and/or multiaxial strain is substantially uniform within a material, as described in greater detail elsewhere herein. However, a material may comprise a stress concentrator, such as a notch, groove, corner, or other nonplanar feature formed in a surface of the material as well as features formed in the bulk of the material such as holes, openings, pores, and other intentionally formed structures that can produce nonuniform stresses and/or strains for producing the desired strain states and conductivity changes. In some embodiments, a stress concentrator may produce multiaxial strain and/or multiaxial stress, even under loading conditions that would correspond to uniaxial strain and/or uniaxial stress in a material lacking a stress concentrator. To provide a non-limiting example, although placing a cylinder of material under linear, axial tension would ordinarily result in the uniaxial loading of the cylinder, a stress concentrator, such as a notch or groove along a wall of the cylinder may produce a zone of multiaxial strain associated with the stress concentrator. More detailed examples are provided with reference to the figures below.

It should be understood that the disclosed methods of applying an elastic strain to alter the doping state of a defect doped material may be applied to any of a variety of suitable compositions. For example, in certain embodiments the defect doped material comprises defect doped diamond (e.g., carbon diamond), gallium oxide ($Ga_2O_3$), gallium nitride (GaN), boron nitride (BN), and/or any other appropriate material capable of having the large disclosed strains applied to them for altering the conduction state of the material. In certain embodiments, the defect doped material is crystalline. In other embodiments, the defect doped material is at least partially amorphous. Additionally, appropriate dopants may include, but are not limited to, nitrogen, boron, phosphorus, and/or combinations thereof. In a certain non-limiting embodiment, a material comprising diamond is defect doped with nitrogen. In such an embodiment, the diamond may comprise about 1% nitrogen heteroatoms replacing carbon atoms.

In some embodiments, it may be desirable for a defect doped material to comprise negative charge carriers (e.g., electrons) and/or positive charge carriers (e.g., holes) depending on the functionality of the defect doped material and/or what application it will be implemented in. Accordingly, a defect doped material may comprise a p-type dopant and/or an n-type dopant.

A defect doped material may comprise defects in any of a variety of suitable concentrations. The concentration of defects in the defect doped material may depend on the material chosen (e.g., diamond, $Ga_2O_3$, BN, and the like). In certain embodiments, the defect doped material comprises defects in a concentration of less than or equal to $10^{30}$ $cm^{-3}$, less than or equal to $10^{25}$ $cm^{-3}$, less than or equal to $10^{20}$ $cm^{-3}$, less than or equal to $10^{15}$ $cm^{-3}$, or less than or equal to $10^{10}$ $cm^{-3}$, or less than or equal to $10^5$ $cm^{-3}$. In some embodiments, the defect doped material comprises the defect in a concentration of greater than or equal to $10^5$ $cm^{-3}$, greater than or equal to $10^{10}$ $cm^{-3}$, greater than or equal to $10^{15}$ $cm^{-3}$, greater than or equal to $10^{20}$ $cm^{-3}$, or greater than or equal to $10^{25}$ $cm^{-3}$. Combinations of the above recited ranges are also possible (e.g., the defect doped material comprises defects in a concentration of less than or equal to $10^{30}$ $cm^{-3}$ and greater than or equal to $10^5$ $cm^{-3}$, the defect doped material comprises defects in a concentration of less than or equal to $10^{25}$ $cm^3$ and greater than or equal to $10^{15}$ cm-3). The concentration of the defects can be measured, in some embodiments, using experimental methods such as X-ray photoelectron spectroscopy (XPS).

In some embodiments, the defect doped material is a single-phase material (i.e., occupies a single, thermodynamically stable phase) in the unstrained state. The defect doped material may also be a single phase material in the strained state, which may be the same phase as in the unstrained state in some embodiments. Similarly, in some embodiments the defect doped material is thermodynamically stable in the strained state. However, the application of excessive amounts of strain may render at least a portion of the defect doped material thermodynamically unstable (e.g. mechanical failure, phase changes, etc.). In some embodiments, it is advantageous to avoid thermodynamic instability and/or phase changes in the defect doped material. For example, avoiding thermodynamic instability and/or phase change may prevent damage to the defect doped material, and/or may improve performance of the defect doped material under cyclic loading conditions. Furthermore, avoiding thermodynamic instability and/or phase change may advantageously preserve the ability to accurately model and predict conductivity within the defect doped material under various strain conditions, since modeling single phase materials is ordinarily simpler than modeling multiphase materials.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A presents a schematic representation of an electronic band structure of a defect doped material including an electronic bandgap between a conduction band 112 and valence band 114 with a bandgap energy 116a. As shown in the figure, a defect may have electronic state 118 within the electronic bandgap and a corresponding activation energy 116b to reach the conduction band edge and/or valence band edge 112. In certain embodiments, the activation energy is too large to ionize the defect from the localized electronic state 114 to the conduction band edge and/or valence band edge 112 by thermal fluctuation energy at room temperature.

Figure 1B:
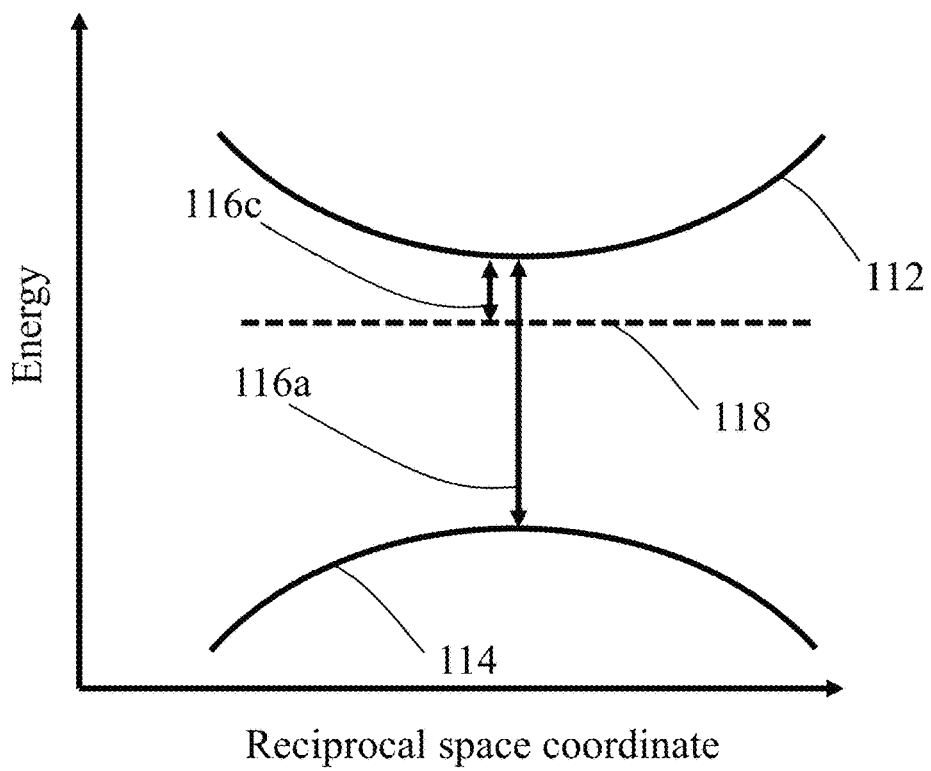
FIG. 1B is a schematic representation of a change in energy difference between a localized electronic state of a defect and an excited electronic state of a defect due to the application of strain, according to certain embodiments.

FIG. 1B represents how applying an elastic strain to the material may either shift the electronic band structure and/or the energy states of the material defects. For example, the electronic state 118 of the defects may move towards the conduction band 112 of the electronic band structure shown in FIG. 1A. Correspondingly, the resulting activation energy 116c to ionize the defects relative to the conduction band has been reduced by the applied elastic strain.

Figure 2A:
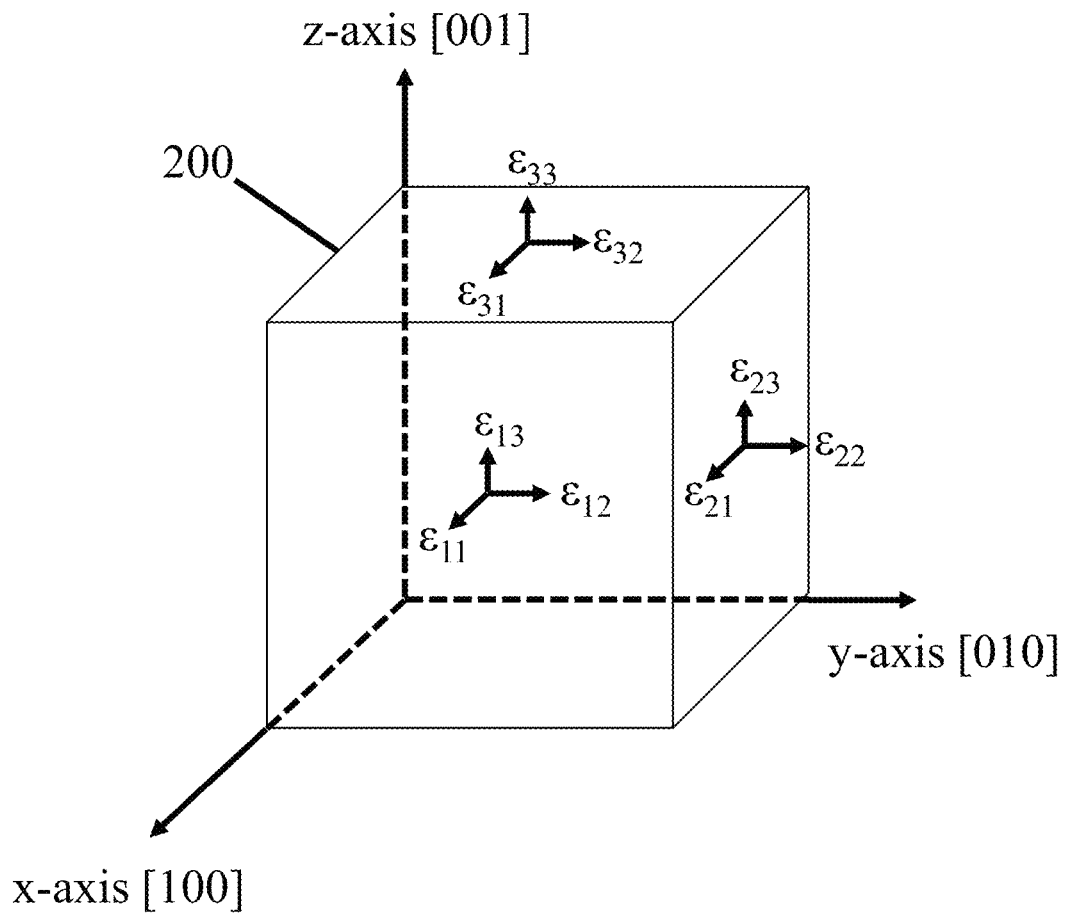
FIG. 2A is a schematic diagram of strains that can be applied to a material, according to certain embodiments.

FIG. 2A illustrates a cubic unit cell 200. The unit cell has diamond cubic crystallographic directions [100], [010], and [001] corresponding to the x, y, and z axes, respectively. A strain tensor may correspond to the various normal and shear strain components that may be applied to the unit cell. Typically, an elastic strain tensor may be indicated by:

$$\varepsilon = \begin{bmatrix} \varepsilon_{11} & \varepsilon_{12} & \varepsilon_{13} \\ \varepsilon_{12} & \varepsilon_{22} & \varepsilon_{23} \\ \varepsilon_{13} & \varepsilon_{23} & \varepsilon_{33} \end{bmatrix}$$

where $\varepsilon_{11}$, $\varepsilon_{22}$, $\varepsilon_{33}$ correspond, in this case, to the strain components that are applied normal to the unit cell in the [100], [010], and [001] crystallographic directions respectfully (i.e., these are extensional strain components). However, it should be understood that, as described above, the strain tensor may be defined with reference to other sets of axes (e.g., a set of principal axes), and/or may be chosen for convenient alignment with forces applied to a material.

Figure 2B:
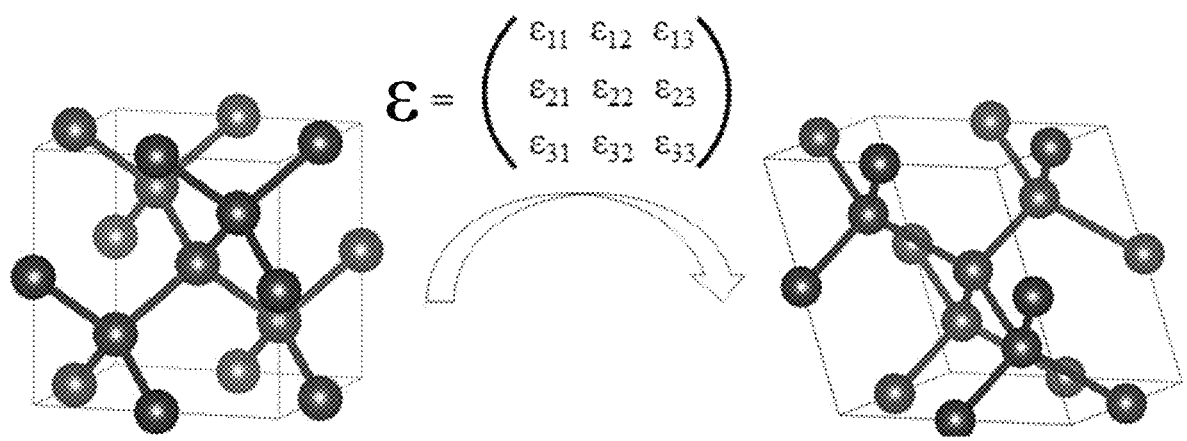
FIG. 2B is a schematic diagram of a strain being applied to deform a unit cell, according to certain embodiments.

The remaining strain components, as indicated in the figure, are applied in directions parallel to the various surfaces of the unit cell and correspond to shear strains applied parallel to the surfaces of the unit cell. For the purposes of the current disclosure, the various strain tensors described herein may correspond to the above noted nomenclature. FIG. 2B illustrates a strain tensor being applied to elastically deform a unit cell of a crystal structure from an undeformed to a deformed configuration. For example, a strain tensor of:

$$\varepsilon = \begin{bmatrix} 10\% & 0 & 0 \\ 0 & 10\% & 0 \\ 0 & 0 & 10\% \end{bmatrix}$$

refers to a strain coordinate corresponding to a 10% triaxial tension of the material, and:

$$\varepsilon = \begin{bmatrix} 0 & 10\% & 0 \\ 10\% & 0 & 0 \\ 0 & 0 & 0 \end{bmatrix}$$

is a strain coordinate corresponding to a 10% pure shear strain being applied to the material.

It should further be understood that typically, an elastic stress tensor may be indicated by:

$$\sigma = \begin{bmatrix} \sigma_{11} & \sigma_{12} & \sigma_{13} \\ \sigma_{12} & \sigma_{22} & \sigma_{23} \\ \sigma_{13} & \sigma_{23} & \sigma_{33} \end{bmatrix}$$

where components of the stress tensor are defined with respect to the same directions as the strain tensor. Thus, for each elastic strain component illustrated in FIGS. 2A-2B, an associated elastic stress component having the same orientation and function may also be assigned.

Figure 3:
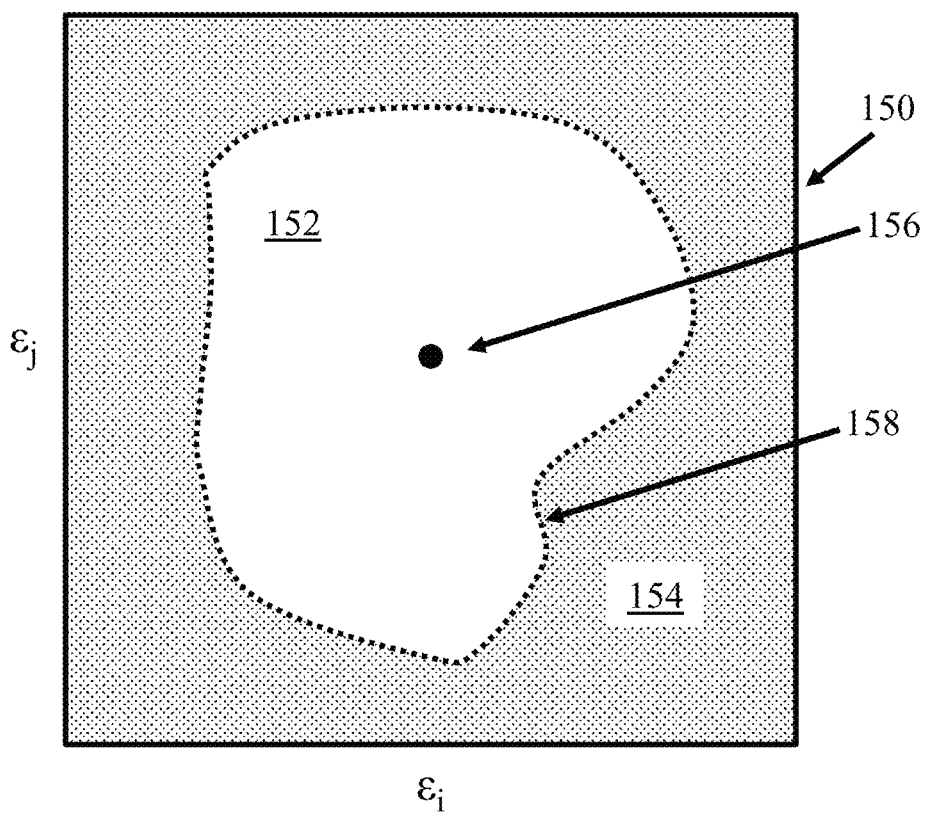
FIG. 3 presents a schematic illustration of phononic stability within a cross-section of a strain-space, according to certain embodiments.

FIG. 3 schematically represents an exemplary stability (e.g., thermodynamic stability and/or mechanical stability) of a defect doped material over a cross-section 150 of a strain space, according to certain embodiments. Strain space 150 comprises axes $\varepsilon_i$ and $\varepsilon_j$, each of which corresponds to a component of the strain tensor (e.g., each of $\varepsilon_i$ and $\varepsilon_j$ corresponds to one of $\varepsilon_{11}$, $\varepsilon_{22}$, $\varepsilon_{33}$, $\varepsilon_{12}$, $\varepsilon_{13}$, or $\varepsilon_{23}$ and $\varepsilon_i \neq \varepsilon_j$), in some embodiments. Strain space 150 further comprises phononically stable region 152, which includes the undeformed state 156 (wherein the strain tensor is zero), and phononically unstable region 154, in some embodiments. According to some embodiments, multiaxial strain that falls within phononically stable region 152 is associated with thermodynamically stable strain states, whereas multiaxial strain that falls within phononically unstable region 154 is associated with thermodynamic instability (e.g. fracture or other material damage) and/or phase change of a defect doped material. According to some embodiments, a phononic stability envelope associated with the transition between phononically stable region 152 and phononically unstable region 154 can be determined using standard phonon calculation packages, trained statistical models, and/or first principle calculations. In some embodiments, the defect doped material is deformed such that the entire defect doped material remains within a phononically stable region of the strain space. Typically, increasing strain tends to increase a probability of phononic instability within a defect doped material. For example, in FIG. 3, a probability of a strain falling within phononically stable region 152 decreases with increasing distance from undeformed state 156. However, phononic stability envelope 158 varies in distance from undeformed state 156, depending on the values of strain coordinates $\varepsilon_i$ and $\varepsilon_j$. Consequently, one advantage of applying multiaxial strain to a defect doped material (e.g., in contrast to applying uniaxial strain) may be an increased capacity to deform the defect doped material without causing thermodynamic instability that might cause material fracture and/or phase change.

FIGS. 4-9 provide exemplary, schematic illustrations of the application of multiaxial strain to defect doped materials, according to some embodiments. Of course, it should be understood that these illustrations are nonlimiting, and that in general a defect doped material may be deformed by any suitable method as the disclosure is not so limited. Additionally, it should be understood that combinations of these disclosed methods and systems may be used to apply any desired strains state.

Figure 4:
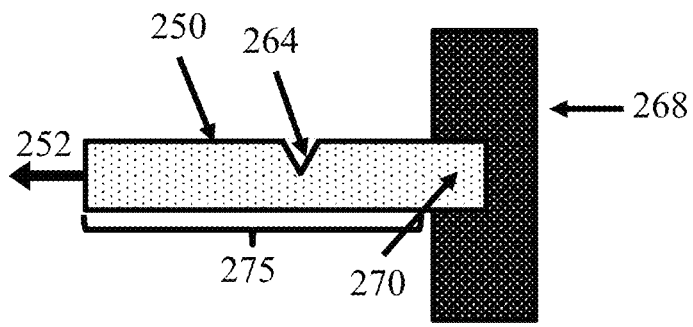
FIG. 4 presents a schematic illustration of an application of multiaxial strain to a defect doped material using an actuator, according to certain embodiments.

In some embodiments, multiaxial strain may be applied using exactly one actuator. For example, FIG. 4 presents an exemplary illustration of defect doped material 250, which is deformed via tensile or compressive strain applied by an actuator (not shown) applied in direction 252 to an end portion of the material and by an end 270, anchored to a substrate 268. Under these conditions, if defect doped material 250 had a uniform width, the result of these conditions would be uniform, uniaxial strain within a first portion 275 of defect doped material 250. However, in this exemplary embodiment, defect doped material 250 comprises a stress concentrator 264, in the form of a surface groove. As a result, strain within defect doped material 250 may be redirected around stress concentrator 264, resulting in non-uniform, multiaxial strain within defect doped material 250.

It should generally be understood that although stress concentrator 264 is represented as a groove, many other irregularities in a defect doped material may act as stress concentrators. For example, in some embodiments, a stress concentrator is a surface feature, such as a groove, a notch, a corner, an edge, a hole, or any other appropriate nonplanar surface feature. In some embodiments, a stress concentrator may also be feature formed in the bulk of the material such as a hole, a pore, a cavity, or other purposefully made structure intended to generate a desired level of stress concentration and multiaxial strains due to its inclusion in the material. Further, it should be understood that these examples are nonlimiting, and that many other features may act as stress concentrators, depending on the embodiment.

Figure 5:
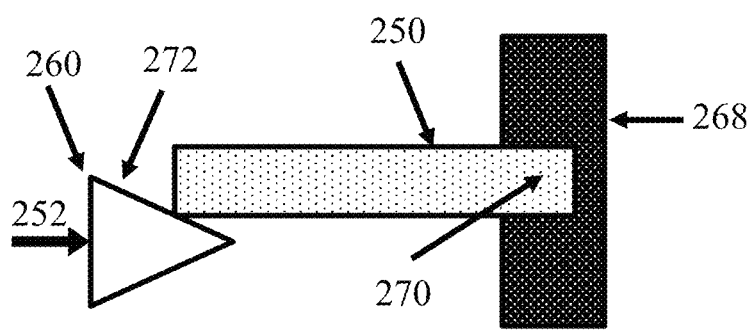
FIG. 5 presents a schematic illustration of an application of multiaxial strain to a defect doped material using an actuator, according to certain embodiments.

In some embodiments, a defect doped material is multi-axially stressed by exactly one actuator, even in the absence of a stress concentrator. For example, FIG. 5 presents one such embodiment, in which exemplary defect doped material 250 comprising end 270 anchored within substrate 268 is deformed by an actuator 260 configured to move in a direction 252. In the example of FIG. 5, actuator 260 is configured to apply an externally-applied mechanical force to defect doped material 250 using an angled surface 272, with the result that the externally-applied mechanical force (comprising both a friction component and a normal component) is neither substantially parallel to nor substantially perpendicular to the surface of the defect doped material at which the externally-applied mechanical force is applied. This may result in a multiaxial strain being applied to the material.

Figure 6:
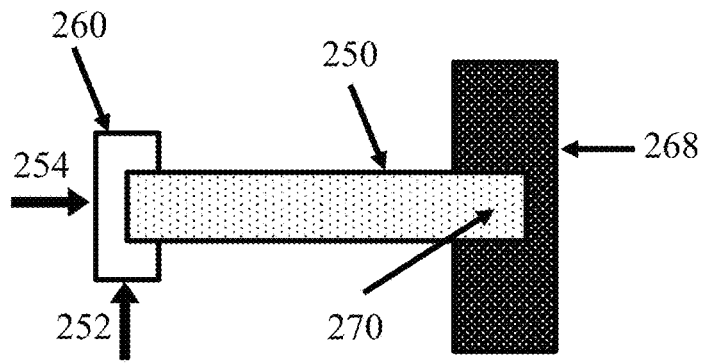
FIG. 6 presents a schematic illustration of an application of multiaxial strain to a defect doped material using an actuator, according to certain embodiments.

As another example, FIG. 6 presents actuator 260, which is configured to deform defect doped material 250 via translational motion in a first direction 252 and translational motion in a second direction 254. In some embodiments, the translational motion in directions 252 and 254 occurs simultaneously (e.g., the actuator may be translated in a single direction angled with respect to directions 252 and 254). However, the translational motion in directions 252 and 254 may also occur sequentially (e.g., the actuator may first be translated in direction 252, then brought to rest, and finally be translated in direction 254). Of course, it should be understood that other variations are possible. For example, a portion of the translational motion in directions 252 and 254 may occur simultaneously, while a portion of each translational motion step occurs separately as the disclosure is not so limited. In this example, at least two of the one or more externally-applied mechanical forces are substantially non-parallel, as a result of the geometry of the actuator, which applies multiple, non-parallel forces to different portions of the defect doped material.

Figure 7:
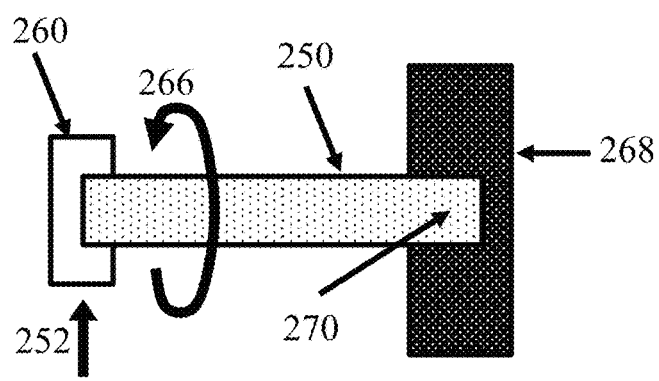
FIG. 7 presents a schematic illustration of an application of multiaxial strain to a defect doped material using an actuator, according to certain embodiments.
Figure 8:
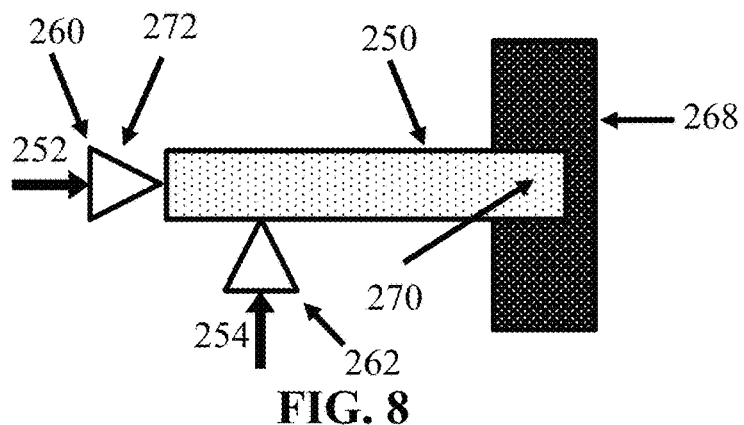
FIG. 8 presents a schematic illustration of an application of multiaxial strain to a defect doped material using actuators, according to certain embodiments.

FIG. 7 presents yet another example of multiaxial strain achieved using a single actuator. In this example, actuator 260 is configured to deform defect doped material 250 via translational motion in a first direction 252 and a rotational motion 266. In some embodiments, translational motion in direction 252 and rotational motion 266 occur simultaneously. However, the translational motion in direction 252 and rotational motion 266 may also occur sequentially. Of course, it should be understood that other variations are possible. For example, a portion of the translational motion in direction 252 may occur simultaneously with a portion of rotational motion 266, while a portion of each motion step occurs separately as the disclosure is not so limited. In this example, at least two of the one or more externally-applied mechanical forces are substantially non-parallel, as a result of the geometry of the actuator, which applies multiple, non-parallel forces to different portions of the defect doped material.

It should further be understood that while these examples represent combinations of rotational and translational motion using a single actuator, they are not all encompassing. For example, a single actuator may be moved translationally in up to three orthogonal directions and/or may be moved rotationally around up to three orthogonal axes. Furthermore, the displacement resulting from motion of the actuator may occur in any suitable order. For example, the translational motion in directions 252 and 254 of FIG. 6 need not occur continuously—in some embodiments, a first portion of the motion in direction 252 may be separated from a second portion of the motion in direction 252 by a period of time in which no motion in direction 252 occurs.

The examples illustrated in FIGS. 4-7 illustrate a coupling between end 270 of defect doped material 250 and substrate 268. A coupling between a defect doped material and a substrate or other body may advantageously facilitate application of strain (e.g., multiaxial strain) to defect doped materials. For example, the coupling between the defect doped material and another body may at least partially oppose an externally-applied mechanical force applied by an actuator. Advantageously, this may allow a defect doped material to reach a static equilibrium. Furthermore, it should be understood that while the defect doped material 250 is presented as a cantilever anchored to substrate 268 in FIGS. 4-7, in general, the form of the defect doped material and the mechanism of its coupling to the substrate or other body are not so limited. For example, in a few, nonlimiting examples, the defect doped material may have the form of a sheet, a cylinder, a cube, a prism, or a sphere. In a few, nonlimiting embodiments, the defect doped material may be coupled to a substrate or other body mechanically, via an adhesive, and/or via chemical bonding (e.g., in the form of metallic bonding, ionic bonding, and/or covalent bonding). In some embodiments, for example, the defect doped material may have the form of a cantilever or needle extending from a surface of a larger body composed of the defect doped material. However, complex geometries including combinations of different shapes are also contemplated.

In some embodiments, a defect doped material is deformed using two or more actuators. An example is presented in FIG. 8, which presents an exemplary defect doped material 250 that is acted upon by a first actuator 260 and a second actuator 262. In this example, first actuator 260 is configured to move in first direction 252 and second actuator 262 is configured to move in second direction 254. Once again, embodiments wherein the actuators take other forms or apply externally-applied mechanical forces in other directions are contemplated, and the disclosure is not limited in this way. In this example, at least two of the one or more externally-applied mechanical forces are substantially non-parallel, as a result of the motion of the actuators in multiple, non-parallel directions.

Figure 9:
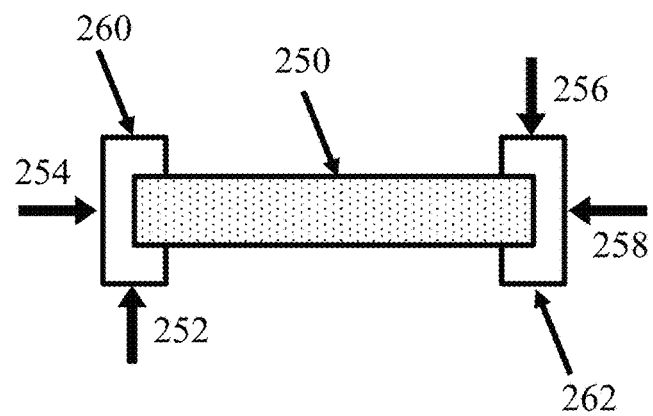
FIG. 9 presents a schematic illustration of an application of multiaxial strain to a defect doped material using actuators, according to certain embodiments.

In some embodiments, a defect doped material acted upon by two or more actuators may not require coupling to an external body or substrate other than an actuator. For example, FIG. 9 presents defect doped material 250 acted upon by first actuator 260 and second actuator 262. In some embodiments, forces applied by first actuator 260 and second actuator 262 reach a static equilibrium with one another without application of additional forces (e.g., opposing forces produced by coupling to a body or substrate). In this example, first actuator 260 is configured to move via translational motion in a first direction 252 and a second direction 254, while second actuator 262 is configured to move via translational motion in a third direction 256 and a fourth direction 258. In this example, at least two of the one or more externally-applied mechanical forces are substantially non-parallel, as a result of the motion of the actuators in multiple, non-parallel directions. In this example, at least two of the one or more externally-applied mechanical forces are substantially non-parallel, as a result of the geometry of the actuators, which apply multiple, non-parallel forces to different portions of the defect doped material.

The form of a defect doped material may, in some aspects, dictate how strain is applied to and/or removed from the defect doped material. The defect doped material may have any of a variety of suitable forms (e.g., structures, sizes, and/or shapes). In some embodiments, a layer may include a defect doped material. However, the defect doped material may be provided in any appropriate form including, but not limited to, a planar layer, a non-planar layer, a rod, a needle, a filament, a three-dimensional structure with one or more holes, and/or any other appropriate structure as the disclosure is not limited to the specific geometry of a material. The disclosed materials may be provided in any appropriate fashion. For instance, a defect doped material may be an epitaxial layer grown on a substrate, a standalone structure, a material that is transferred onto a substrate, and/or any other appropriate construction as the disclosure is not so limited.

In certain embodiments, at least a portion of a defect doped material has the form of a nanostructure (e.g., a nanoneedle, a nanowire, nanoparticle, nanosheet, nanorod, and the like). "Nanostructure" is used herein in a manner consistent with its ordinary meaning in the art. In certain embodiments, a nanostructure has a characteristic dimension, such as a layer thickness, or other appropriate dimension, that is between or equal to 1 nm and 1 micrometer. However, in other embodiments, at least a portion of the defect doped material is in the form of a microstructure (e.g., microlayer, microwire, microparticle, microsheet, microrod, and the like). "Microscale" is used herein in a manner consistent with its ordinary meaning in the art. According to certain embodiments, a microstructure has a characteristic dimension, such as a layer thickness, or other appropriate dimension, that is greater than or equal to 1 micrometer to less than or equal to 5 micrometers. Accordingly, in some embodiments, the disclosed materials have a characteristic dimension that is between or equal to 1 micrometer and 2 micrometers, 10 nm and 1 micrometer, 10 nm and 500 nm, 10 nm and 100 nm, and/or any other appropriate length scale. Combinations of the above cited ranges are also possible.

In some embodiments, a characteristic dimension, such as a thickness, of a defect doped material can be measured using electron microscopy techniques (e.g., scanning electron microscopy and/or transmission electron microscopy). The electron microscopy techniques can be supplemented by, for example, profilometry (e.g., optical or contact profilometers).

Having generally described the concept of applying an elastic strain to a material to alter its conductive properties, several methods for either permanently, or selectively applying these strains are described below. Generally, these methods may include both static and/or dynamic methods of applying an elastic strain to a defect doped material including, but not limited to, lattice mismatch during epitaxial growth of the material with a substrate, direct deformation of the material with an actuator or other structure, deformation of a substrate a defect doped material is disposed on, and/or any other appropriate method of applying a desired elastic strain to the material.

To aid in applying the desired elastic strains to the defect doped material, in some embodiments, the layer of material may have one or more stress concentrations formed therein, to aid in focusing the strain in one or more desired portions of the defect doped material. For example, a series of holes, not depicted, may be formed in a layer of defect doped material to create portions of the defect doped material that are subjected to elevated stresses and strains as compared to other portions of the defect doped material.

As explained herein, using strain to either statically and/or selectively control a defect doped material to have either a shallow doping level and/or a deep doping level permits the creation of charge carriers in the defect doped material. As a result, these defect doped materials have the ability to transition from a non-conducting material when in the unstrained state to a semiconducting or a conducting material when in the elastically strained state. Accordingly, in some aspects, the defect doped materials disclosed herein may be beneficial for use in forming at least a portion of a circuit.

Figure 10:
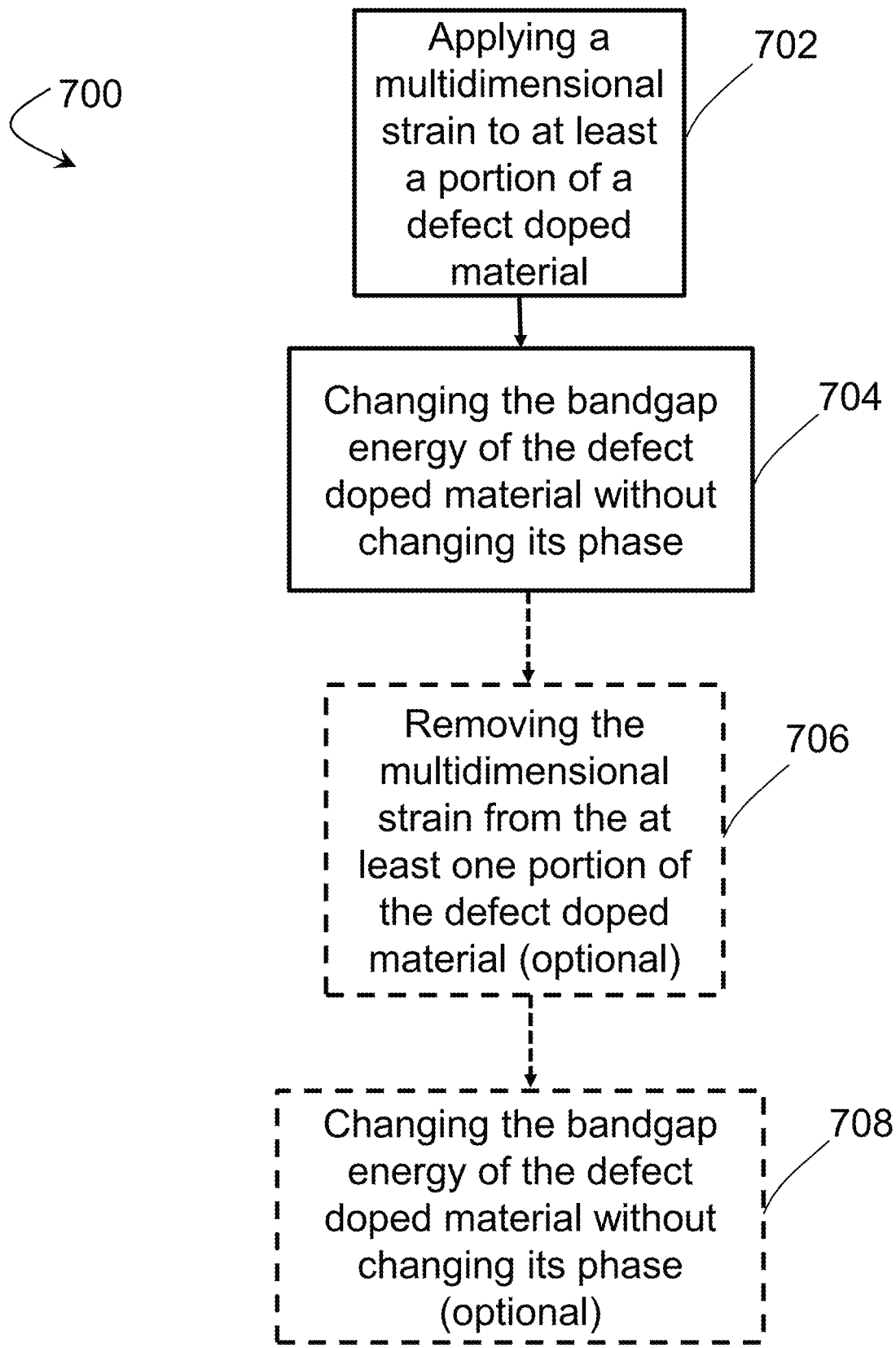
FIG. 10 presents an exemplary method of applying multiaxial strain to a material, according to certain embodiments.

Certain embodiments described herein may be related to a method of controlling a conductive state of a defect doped material. The conductive state of a defect doped material can be controlled, in some embodiments, by applying strain to at least a portion of the defect doped material. FIG. 10 is, according to some embodiments, a flow chart describing a method of controlling a conductive state of a defect doped material. As shown in FIG. 10, a method of controlling a conductive state of a defect doped material 700 may include step 702 comprising applying a strain to at least a portion of a defect doped material. As a result, in some aspects, a corresponding composition may comprise a defect doped material with a strain applied to at least a portion of the defect doped material. According to some embodiments, the strain is an elastic strain (i.e. a recoverable non-plastic deformation).

As a result of applying strain to the defect doped material, the defect doped material may transition from a non-conducting material to a semiconducting material or a conducting material. For example, as shown in FIG. 10, method 700 comprises step 704 where the defect doped material transitions from a non-conducting material to a semiconducting material or a conducting material. Transitioning from a non-conducting material to a semiconducting material or a conducting material may comprise decreasing a defect's activation energy to ionize the doped defects to form a plurality of charge carriers. Upon applying the strain to the defect doped material, for example, the activation energy to ionize defects of the defect doped material to form a plurality of charge carriers may decrease from a larger first energy (e.g., greater than or equal to 1,000 meV) to a smaller second energy (e.g., less than or equal to 200 meV).

Depending on the application of the defect doped material, it may be desirable to selectively transition the material from the semiconducting material or the conducting material back to a non-conducting material. Accordingly, a strain may be removed from at least a portion of an elastically strained defect doped material such that the material returns to the original unstrained state. For example, in certain embodiments, the defect doped material is implemented in a semiconducting or conducting device where it is desirable to return to a deep dopant state from a shallow dopant state to change from a semiconducting material or a conductive material to a non-conducting material. This may have applications for switching, memory, or other appropriate processes. In either case, the conductive state of a defect doped material can be controlled, in some embodiments, by removing a previously applied elastic strain from at least a portion of the defect doped material as shown in FIG. 10 at step 706. As a result, in some aspects, a composition associated with the disclosed methods and systems may comprise a defect doped material where at least a portion of the defect doped material is in an unstrained state during at least one mode of operation. For example, as shown at step 708, the defect doped material may transition from the semiconducting material or the conducting material to the non-conducting material. Transitioning from the semiconducting material or conducting material to the non-conducting material may correspond to increasing the activation energy to ionize a defect to form a plurality of charge carriers. Upon removing the strain from the defect doped material, for example, the activation energy to ionize defects of the defect doped material to form a plurality of charge carriers may increase from a smaller energy (e.g., a shallow dopant state that is less than or equal to 200 meV) to a larger energy (e.g., a deep dopant state that is greater than or equal to 1,000 meV). Accordingly, the conducting state of a defect doped material may be selectively controlled by the selective removal and application of elastic strain to a defect doped material, such that the defect doped material may selectively transition between a semiconducting material or a conducting material and a non-conducting material.

As noted above, in some embodiments, it is advantageous, to cyclically apply and remove strain to a defect doped material to selectively control a conducting state of the defect doped material. The cyclic application and removal of strain to control a conducting state of a defect doped material may be beneficial in applications such as electronic switching components, memory devices, as well as other applications. Thus, in some embodiments the method 700 of FIG. 10 may be continuously and selectively applied during operation of a device. For example, after the completion of step 708 where the material transitions from the semiconducting material or conducting material to a non-conducting material, step 702 comprising applying a strain to at least a portion of the defect doped material may be repeated, followed by steps 704-708 again. The cyclic application and removal of strain may be performed any number of times and may be applied with any appropriate frequency. For example, a first strain may be applied to the defect material, followed by removal of the first strain from the defect doped material, followed by a second strain applied to the defect doped material, followed by removal of the second strain from the defect doped material, etc. In certain embodiments, the first strain, second strain, and/or any additional strains are the same. However embodiments in which different amounts of strain are applied to a defect doped material to provide different material properties during different operating modes are also contemplated as the disclosure is not limited in this fashion.

While the above embodiment is directed to the cyclic application and removal of strains to a defect doped material, the current disclosure is not limited to only the cyclic application of strains to a defect doped material. For example, in some embodiments, the defect doped material has a permanent or static elastic strain applied to maintain the defect doped material as a desired semiconducting material or conducting material.

In view of the above, the compositions described herein comprising an elastically strained defect doped material may be used in a variety of suitable semi-conductor devices including, for example, photonic devices, optoelectronic devices, high speed electronic devices, spintronic devices, photovoltaic devices, light-emitting devices (e.g., light-emitting diodes or LEDs), and the like. According to some embodiments, the defect doped material can be used as a memory device. As described herein, for example, a defect doped material may be dynamically toggled to permit or prevent the ionization of the defects to form charge carriers due to the selective application of an elastic strain. Thus, the defect doped material may be incorporated into a memory device due to the ability to cyclically toggle between one or more localized electronic states of the defect and one or more excited electronic states. In such a memory device, the writing may comprise applying strain, and the readout may comprise an electrical and/or optical readout of the conductive state of the elastically strained material.

The following examples are intended to illustrate certain embodiments of the present invention, but do not exemplify the full scope of the invention.

EXAMPLE 1

This example demonstrates that it is possible to achieve 0 eV electronic bandgap in undoped diamond exclusively through the imposition of multiaxial elastic strains, without triggering phonon instability or phase change. This discovery implies that reversible metallization/de-metallization is feasible through judicious design of mechanical loading conditions and geometry in nanoscale diamond. This example also reveals that even simple bending of low-index <110> oriented monocrystalline diamond nanoneedles can effectively reduce the electronic bandgap from 5.6 eV down to 0 eV without phonon instability, at about 10.8% local compressive elastic strain. However, the example also demonstrates that further bending of the nanoneedle can however induce phonon instabilities that lead to irreversible $sp^3 \rightarrow sp^2$ (diamond to graphite) phase transition or fracture.

Figure 11:
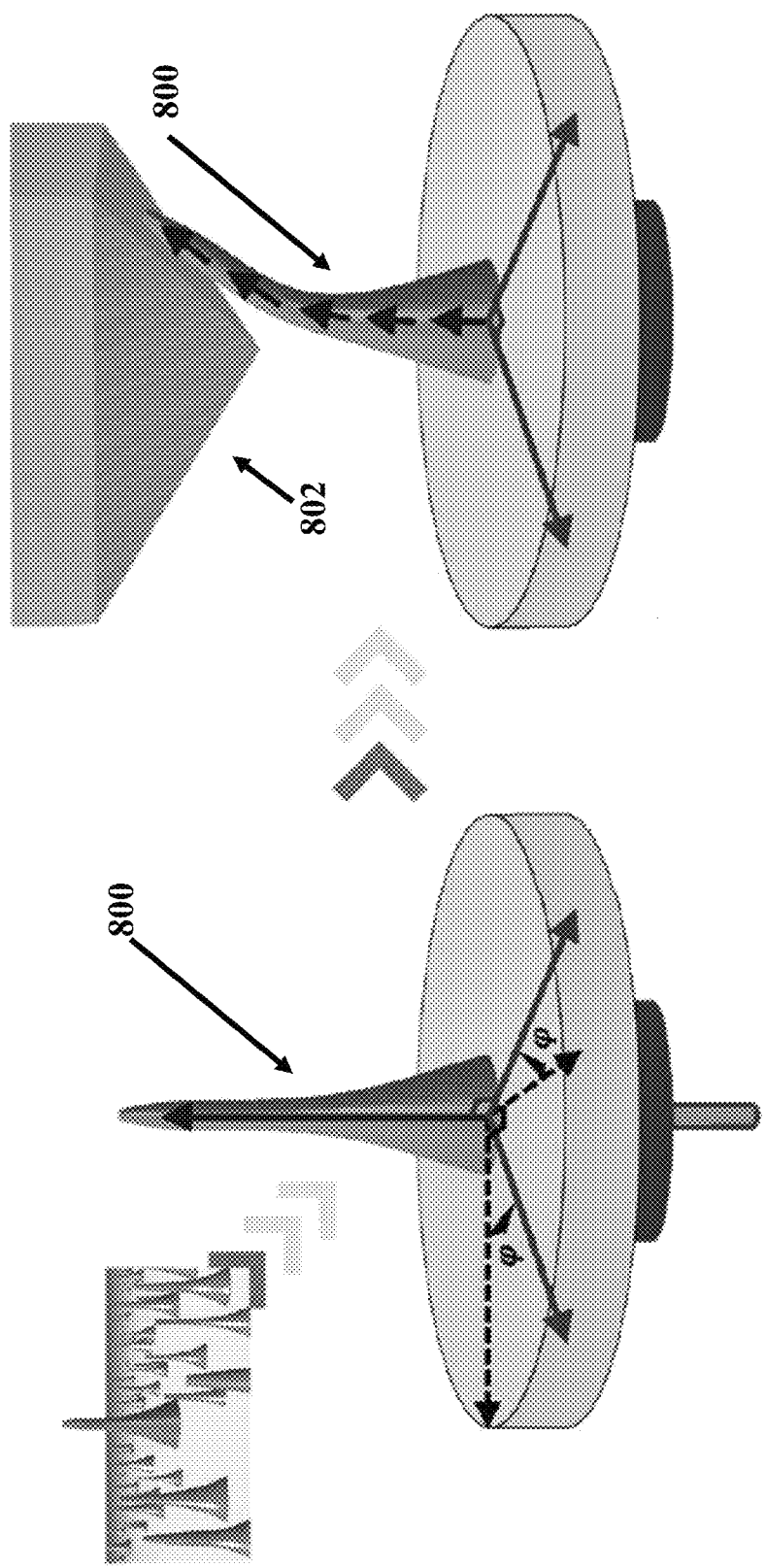
FIG. 11 presents a schematic illustration of an application of multiaxial strain to a material using an actuator, according to certain embodiments.

Diamond nanoneedles may exhibit ultra-large elastic bending before fracture. In this example, deflection of diamond nanoneedles by an actuator (a diamond indenter), was simulated to demonstrate the role that multiaxial strain may play in metallizing the diamond nanoneedles. The presented schematically in FIG. 11, which show a diamond nanoneedle 800 deformed by contact with diamond indenter 802, which acts as an actuator, was simulated.

Such deformation, resulting in local compressive strains larger than −10% and tensile strains in excess of 9%, is reversible upon release of the load. Here simulations were applied to determine electronic bandgap modulation in bent diamond nanoneedles at maximum local strain levels that are known to be experimentally feasible. Initially, strain of the deformed nanoneedle was determined by finite element method (FEM) calculations used to simulate the sideward bending moment of the diamond needle upon contact with the indenter tip and to account for nonlinear elasticity, the orientation of the cubic lattice with respect to the needle axis, the bending direction, and possible friction between the indenter tip and the needle. Various degrees of deformation of the diamond nanoneedle were simulated, producing different spatial distributions of strain.

Figure 12A:
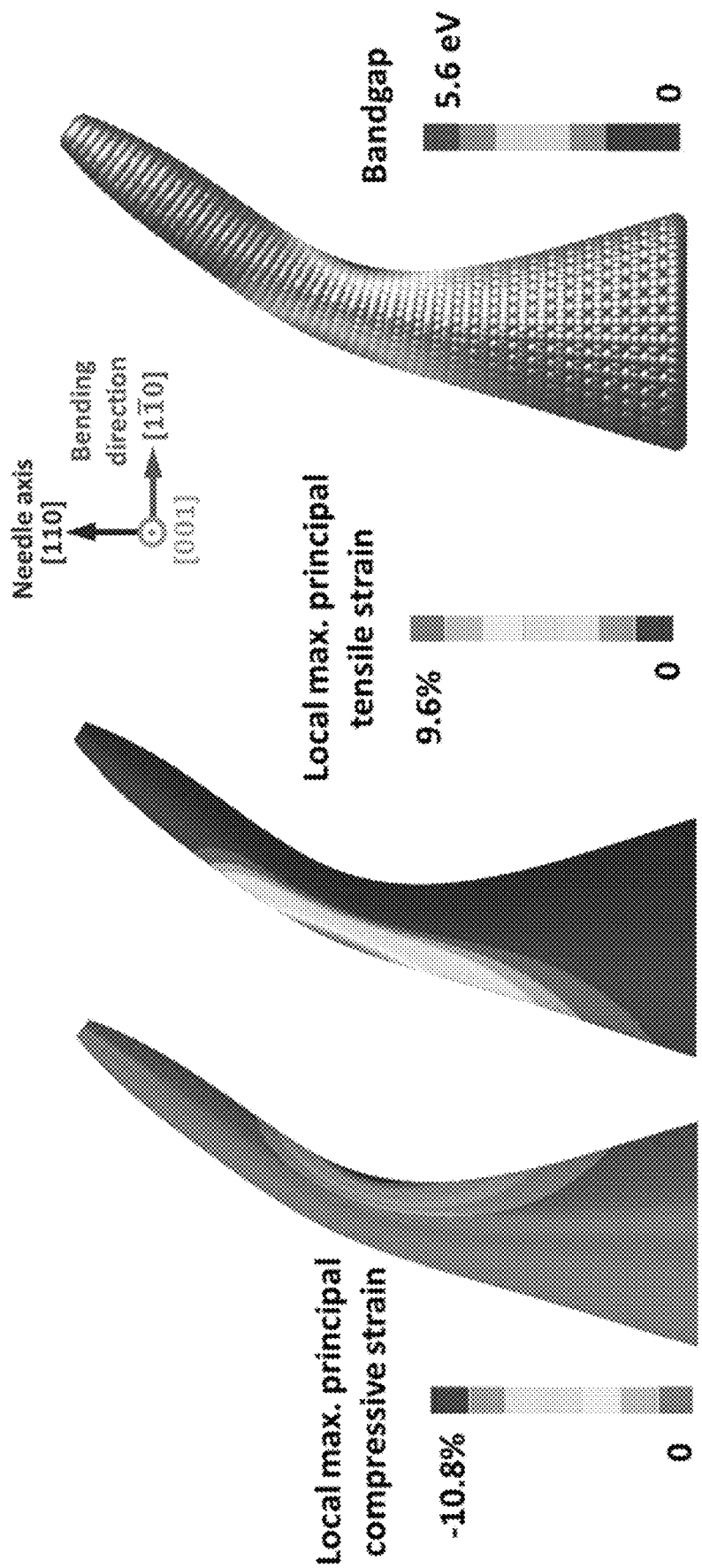
FIG. 12A presents a multiaxial stress state of a nanoneedle, in some embodiments.

FIG. 12A shows FEM predictions of local compressive and tensile strains of a deformed geometry of <110> diamond nanoneedle, with the maximum compressive and tensile strains of −10.8% and 9.6% respectively.

The electronic band structures of diamond under tensorial strain were predicted ab initio, using a machine learning (ML) model of electronic band structures with high accuracy based on ab initio density functional theory (DFT) followed by GW calculations. (GW calculations are made using the GW approximation, where the system to (or from) which the electron is added (or removed) is described as a polarizable, screening medium. This is expressed by the name of the approximation: 'GW' stands for the one-particle Green's function G and for W, the dynamically screened Coulomb interaction.) Because GW calculations are computationally expensive, in this example a stress-strain constitutive law for modeling large elastic deformation of diamond in any arbitrary sample geometry, along with fast proxy models for the electronic and phonon band structures was used to produce a machine learning (ML) model of band structures based on GW approximation training data, so as to perform coupled ab initio and finite element calculations with constitutive laws based on neural nets.

Thus, in addition to the FEM analysis of the diamond nanoneedle, FIG. 12A presents the corresponding predictions of the spatial distribution of the electronic bandgap of the diamond. The onset of metallization appears in the severely strained compressive side of the nanoneedle at a local strain of −10.8%, as shown in FIG. 12A.

Additionally, in this example, phononic stability analysis was used to determine the maximum extent to which stable deflection could be supported by the diamond nanoneedle, using a phononic stability model described in Example 2, below. Briefly, whether mechanically strained or not, the absence of non-real and/or negative phonon frequency for the wavevector in the entire Brillouin zone is the hallmark of a locally stable crystal lattice. If a strained perfect crystal lattice has a stable phonon band structure, then at T=0 K and in the absence of defects such as free surfaces, interfaces and dislocations, this lattice is guaranteed to avoid spontaneous phase transition or defect nucleation. Consequently, phonon stability is the minimal requirement for lattice stability and loading reversibility.

Figure 12B:
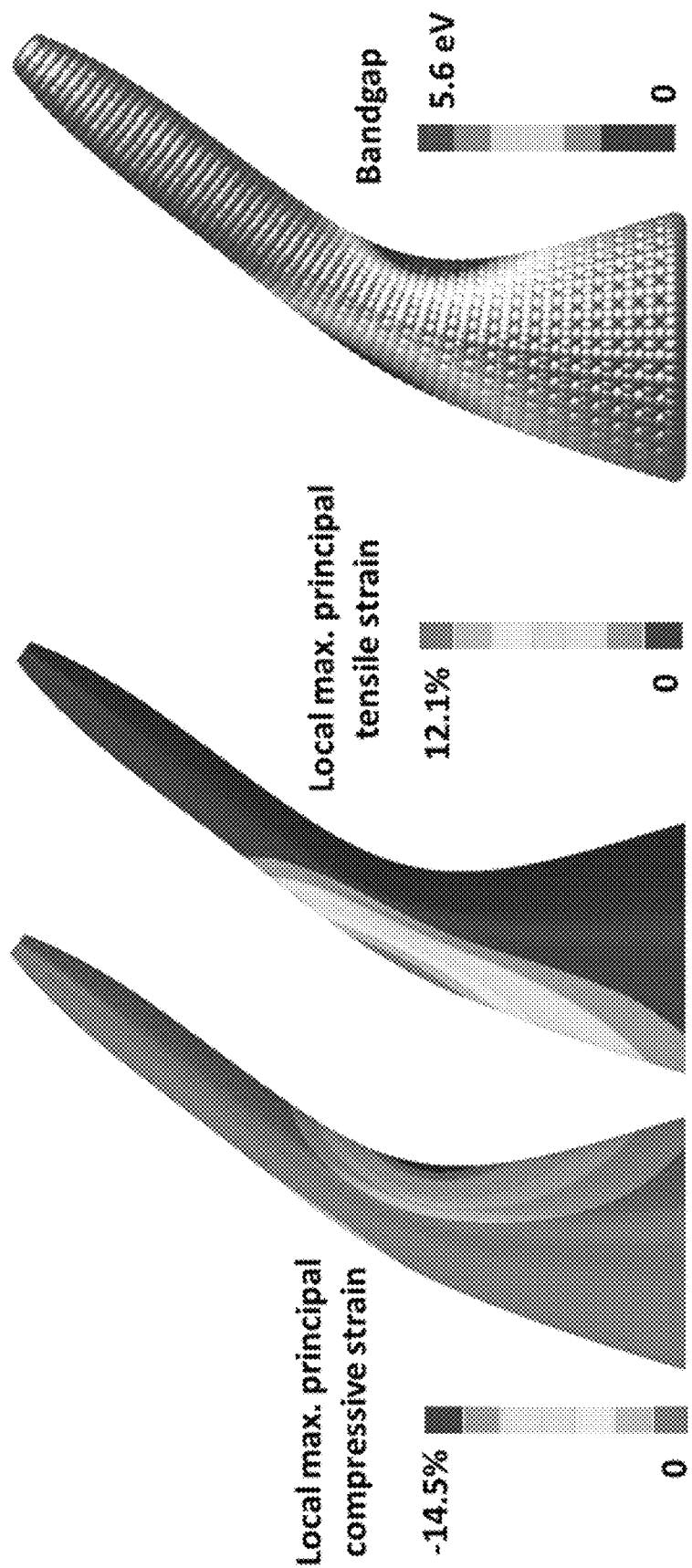
FIG. 12B presents a multiaxial stress state of a nanoneedle, in some embodiments.

FIG. 12B presents the diamond nanoneedle of FIG. 12A under the largest deflection observed to be phononically stable. The <110> nanoneedle was able to withstand up to 12.1% local tensile strain before incurring phonon instability on the tensile side, at an electronic bandgap of 0.62 eV, as shown in FIG. 12B. The compressive side was more tolerant to deformation. The maximum attainable compressive strain could be on the order of −20% along a low-index orientation [133], suggesting that there was room for additional elastic deformation after achieving "safe" metallization in compression-dominated regions. The opposing portions of material that were transformed into a conductive strained phase illustrate that it is also possible to apply non-homogenous strains to a structure to produce conductive portions of the structure that may at least partially overlap with one another to produce a conductive, or semiconductive, path from one portion of the structure to another while the remaining portions remain non-conductive. Such portions of the structure may be associated with conductive traces, electrical pads, or other structures that permit the overall structure to be integrated into an electronic circuit.

Figure 13B:
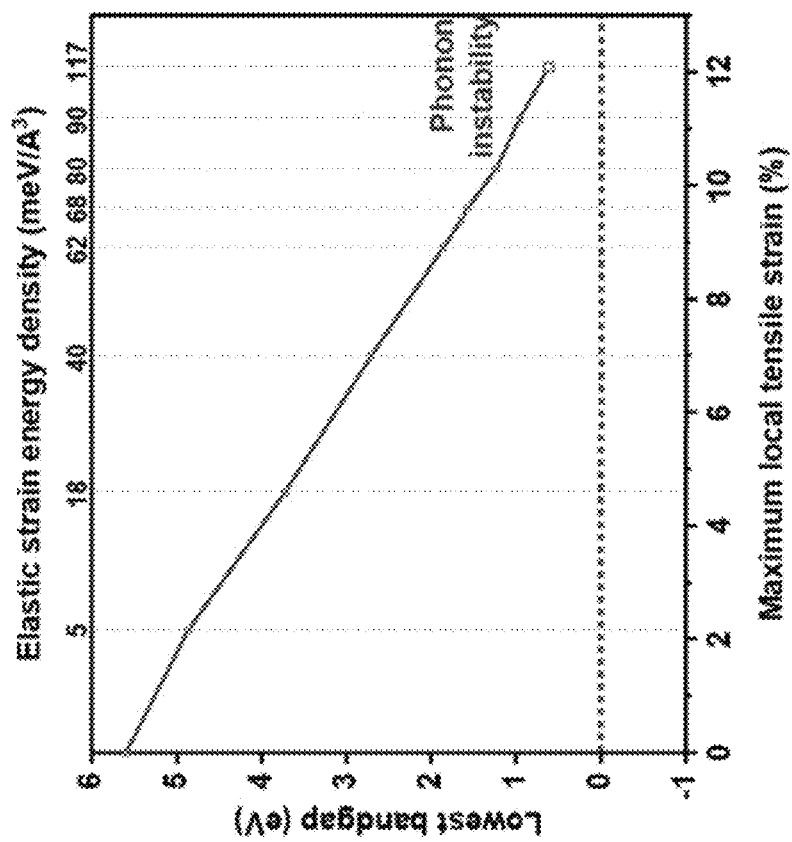
FIGS. 13A-13B present minimum electronic bandgap energy of an exemplary material as a function of strain, according to some embodiments.
Figure 13A:
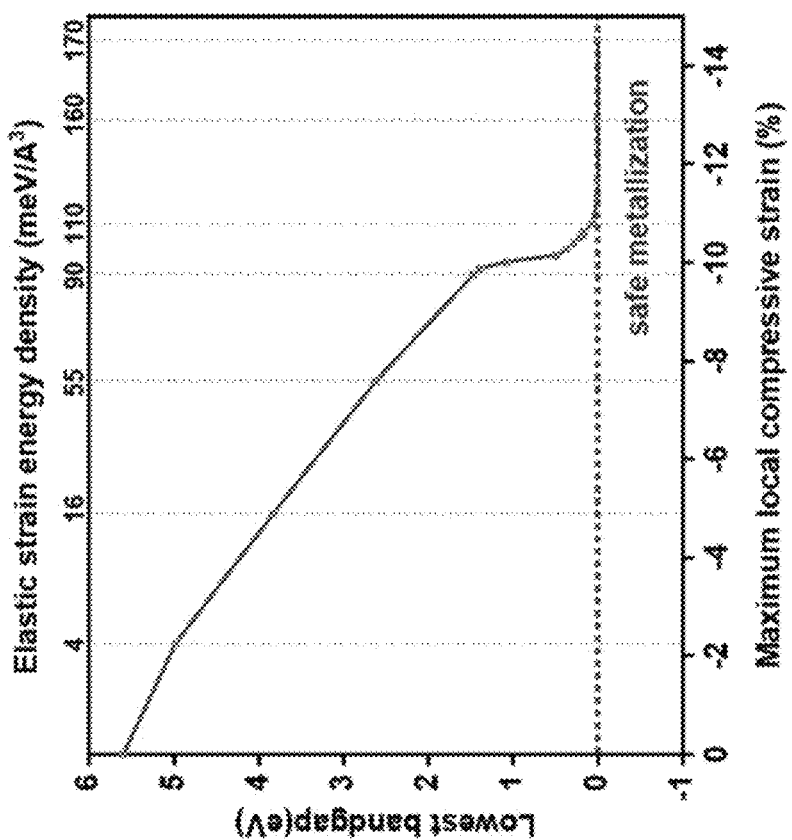

FIGS. 13A-13B present the lowest electronic bandgap of the diamond nanoneedles expected as a function of compressive (FIG. 13A) and tensile (FIG. 13B) stress. Under compressive stress, the diamond nanoneedles transitioned from a non-conducting state (under zero strain) to a "safe" metallic state, as indicated by the reduction of the electronic bandgap to zero in FIG. 13A. By contrast, in FIG. 13B, while tensile strain reduced the electronic bandgap of the diamond nanoneedle, the electronic bandgap did not reach zero before a phononic instability was encountered (indicated by the labeled point) that would result in graphitization of the diamond under tension. Nonetheless, the diamond nanoneedle still experienced a transition from a non-conducting state to a semi-conducting state as simulated tensile strain increased.

Figure 15A:
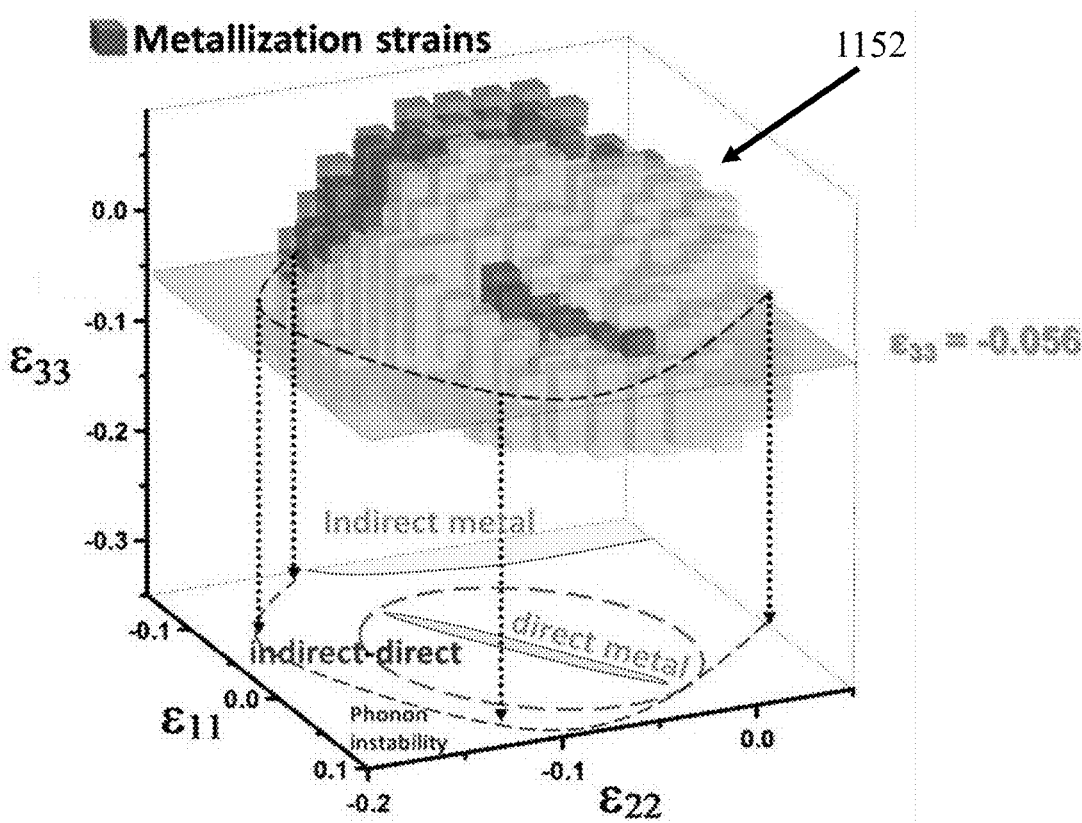
FIGS. 15A-15B present cross-sections of a phonon stability region within a strain-space for an exemplary material, according to some embodiments.
Figure 15B:
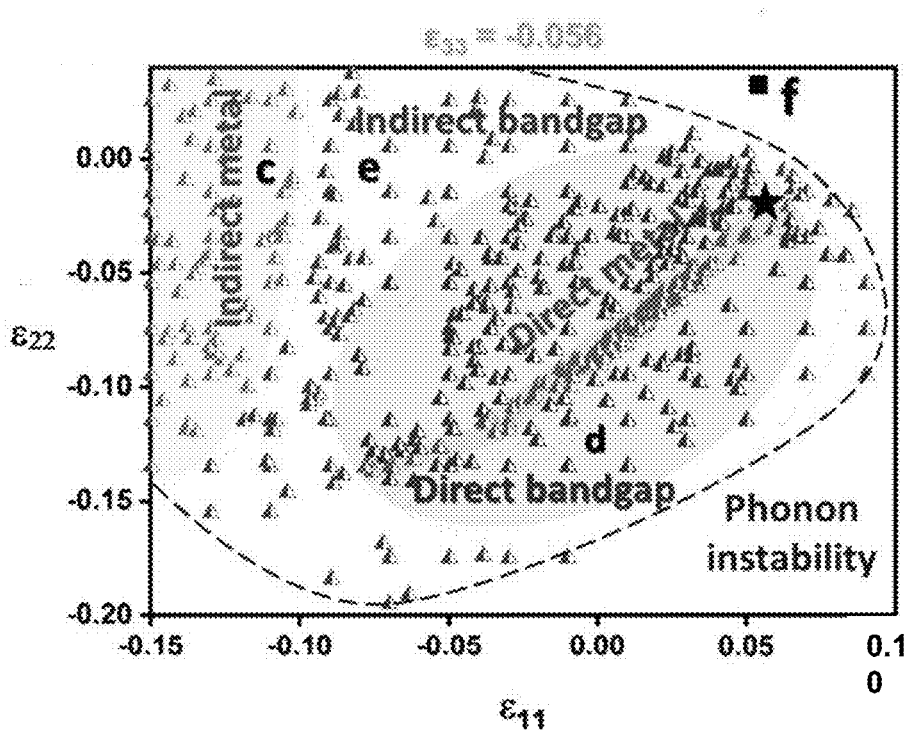

Different simulations of deflection of the diamond nanoneedle, with different coefficients of friction between the nanoneedle and the actuator, indicated that the tendency to metallize as overall strain increased was independent of friction between the actuator and the diamond nanoneedle. The <110> nanoneedle could withstand up to 12.1% local tensile strain before incurring phonon instability on the tensile side, at an electronic bandgap of 0.62 eV, as shown in FIG. 15B. The compressive side was more tolerant to deformation. The maximum attainable compressive strain could be on the order of −20% along a low-index orientation, suggesting that there was room for additional elastic deformation after achieving "safe" metallization in compression-dominated regions. Note that due to the zero-point motion effect and the Varshni effect, for physical experiments performed at room temperature, the electronic bandgap of diamond is expected to be even smaller than estimated here by 0.4-0.6 eV. This understanding leads to the inference that safe metallization in diamond can occur at elastic strain levels somewhat smaller than indicated by these calculations, making metallization more easily achievable (and/or achievable at lower strains) than the results in FIGS. 13A-13B suggest. It should, of course, be understood that although the approaches taken in this example were applied to undoped diamond, an identical approach can taken using defect doped diamond, as is described in later examples.

EXAMPLE 2

As mentioned above, phonon stability is the minimal requirement for lattice stability and loading reversibility. This example describes, in greater detail, a method for computing phononic stability of a given stress state in undoped diamond, and for combining these calculations with electronic bandgap calculations as described in Example 1 to determine the stability of a given stress state.

In this example, the same ML algorithms introduced in Example 1 were applied to fit the phonon dispersion of a given material, using training data computed at a variety of the 6D strain values. Training data were produced using phonon calculations that were mainly conducted using the VASP-Phonopy package. 2×2×2 supercells of 16 carbon atoms were created, and phonon calculations were conducted with a 3×3×3 k-point mesh. Whenever accurate phonon stability check was needed for diamond primitive cell, DFPT [160] as implemented in Quantum ESPRESSO [161] was adopted, with a dense 11×11×11 k-grid and 6×6×6 q-grid.

Figure 14:
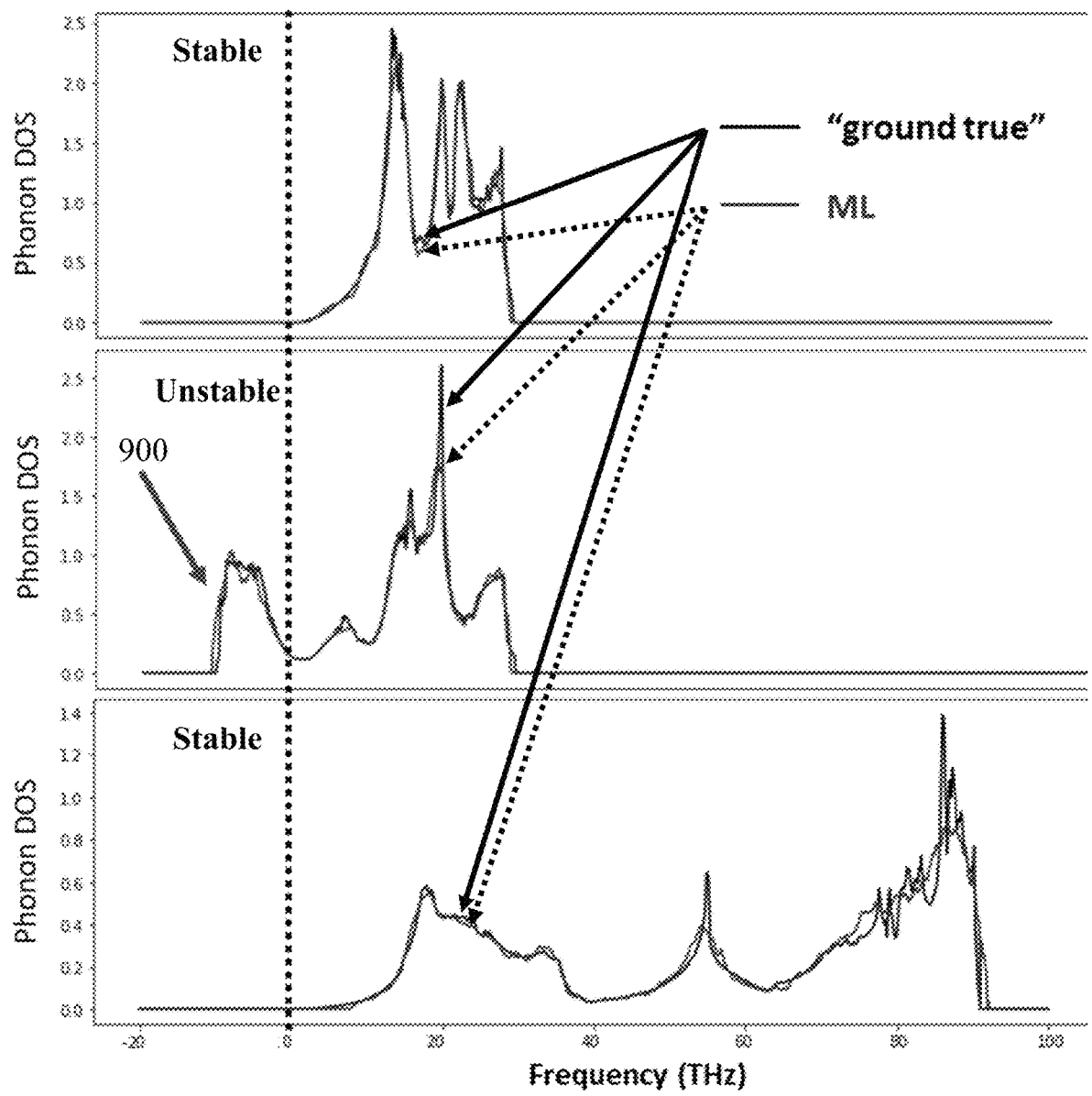
FIG. 14 presents exemplary phonon density of state functions, according to some embodiments.

Since phononic stability depends on the absence of non-real and/or negative frequency values, the trained ML model could be used to identify a stability envelope within strain space. FIG. 14 presents the phonon density of states (DOS), computed at 3 different strains, comparing results of the ML model and first principles calculations (labeled "ground true"). In the top and bottom examples, all frequencies are real and non-negative, resulting in a zero density of states at negative frequencies. When non-real or negative frequencies are observed, the density of states function becomes nonzero at negative frequencies, as indicated by feature 900 of FIG. 14. Thus, the strains associated with the top and bottom phonon density of states functions presented in FIG. 14 are considered to be phononically stable, whereas strains producing features such as feature 900 are considered phononically unstable. Generally, while the ML model does not perfectly match the results of first principles calculations, the DOS functions produced by first principles and the ML model broadly agree on the major structural features of the DOS functions presented in FIG. 14, indicating the viability of this approach for phononic stability calculations.

Using the ML model, a phonon stability envelope was calculated for the 6 dimensional strain space of diamond. By combining this envelope with an electronic bandgap model, the graphs represented in FIGS. 15A-15B were produced. FIG. 15A presents a 3D cross-section of strain space, indicating with voxels the positions of phononically stable strains within a phononically stable region 1152. Each voxel is shaded according to the state of the diamond at that strain. As indicated in FIG. 15A, dark shaded voxels correspond to metallized strains. Projected below the phononically stable region 1152 is a smoothed rendering of a cross-section of phononically stable region 1152 collected at $\varepsilon_{33}=-0.056$ indicated by the shaded rectangle. Regions of this cross-section corresponding to different states of the electronic bandgap (e.g., direct metal, direct bandgap, indirect bandgap, and indirect metal) are indicated using labeled curves within the projection of the cross-section.

FIG. 15B presents the projected cross-section of FIG. 15A, in greater detail. Superimposed on this cross-section are a collection of strain points at which the electronic bandgap was calculated, allowing determination of the boundaries between regions of stable strain with different electronic bandgap states. Here, the phononic stability envelope is indicated by the dashed lines.

As indicated by this example, the phononic stability of a given strain may be determined using calculation methods described herein. In conjunction with estimates of strain on a material, this approach may therefore be used to identify the thermodynamic stability of a material under a given multiaxial strain. It should, of course, be understood that although the approaches taken in this example were applied to undoped diamond, an identical approach can taken using defect doped diamond, as is described in later examples.

EXAMPLE 3

Figure 16:
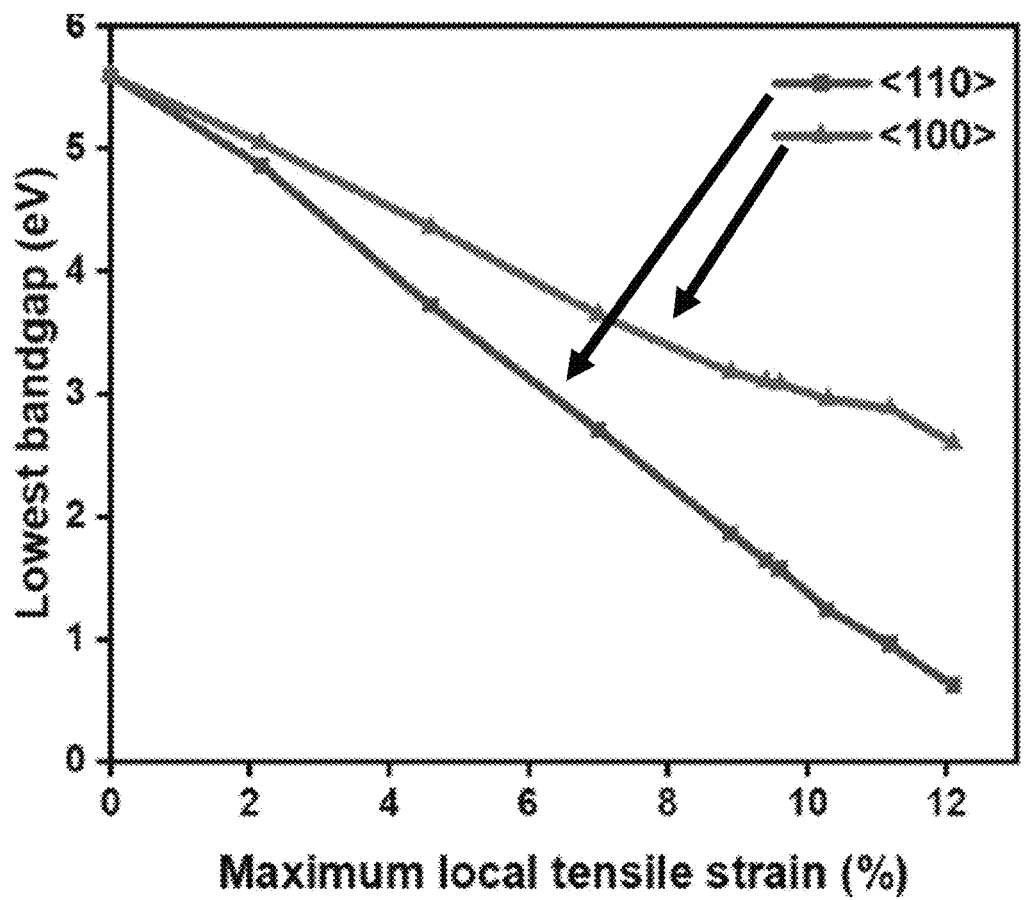
FIG. 16 presents a minimum electronic bandgap energy of exemplary nanoneedles with different crystal orientations as a function of strain, according to some embodiments.

Crystallographic orientation of a material is another variable determining the extent of large strain values, and the resultant electronic bandgap modulation. In this example, deformation of undoped diamond nanoneedles with the <100> orientation family and the <111> orientation family, rather than the <110> orientation family reported in Example 1, was studied. The methods in this example are identical to the methods of Example 1 in all respects other than orientation of the needle. The needle in the <110> orientation family required relatively smaller tensile strains to reduce the electronic bandgap through straining, whereas reducing the electronic bandgap of the needle in the <100> orientation family was hardest. This is illustrated in FIG. 16, which illustrates the minimum electronic bandgap of each needle as a function of the maximum tensile strain applied to the needle. While the unstrained needles had the same electronic bandgap, the needle in the <110> orientation family experiences a more rapid decline in electronic bandgap with applied stress, as indicated by the more negative slope of this curve. This distinction was attributed to the difference in flexibility to access all six components of the strain tensor expressed in the [100] [010] [001] coordinate frame. Despite the possibility of extremely large strain in a <100>-oriented nanoneedle, this orientation primarily facilitates normal strains and the resultant maximum electronic bandgap reduction is limited before phonon instability is reached, causing fracture or phase transformation. For deformation of the <110> and <111>-oriented needles, on the other hand, it is relatively easier to initiate both normal and shear strain components that contribute to electronic band structure engineering and the resultant electronic bandgap modulation.

Figure 17:
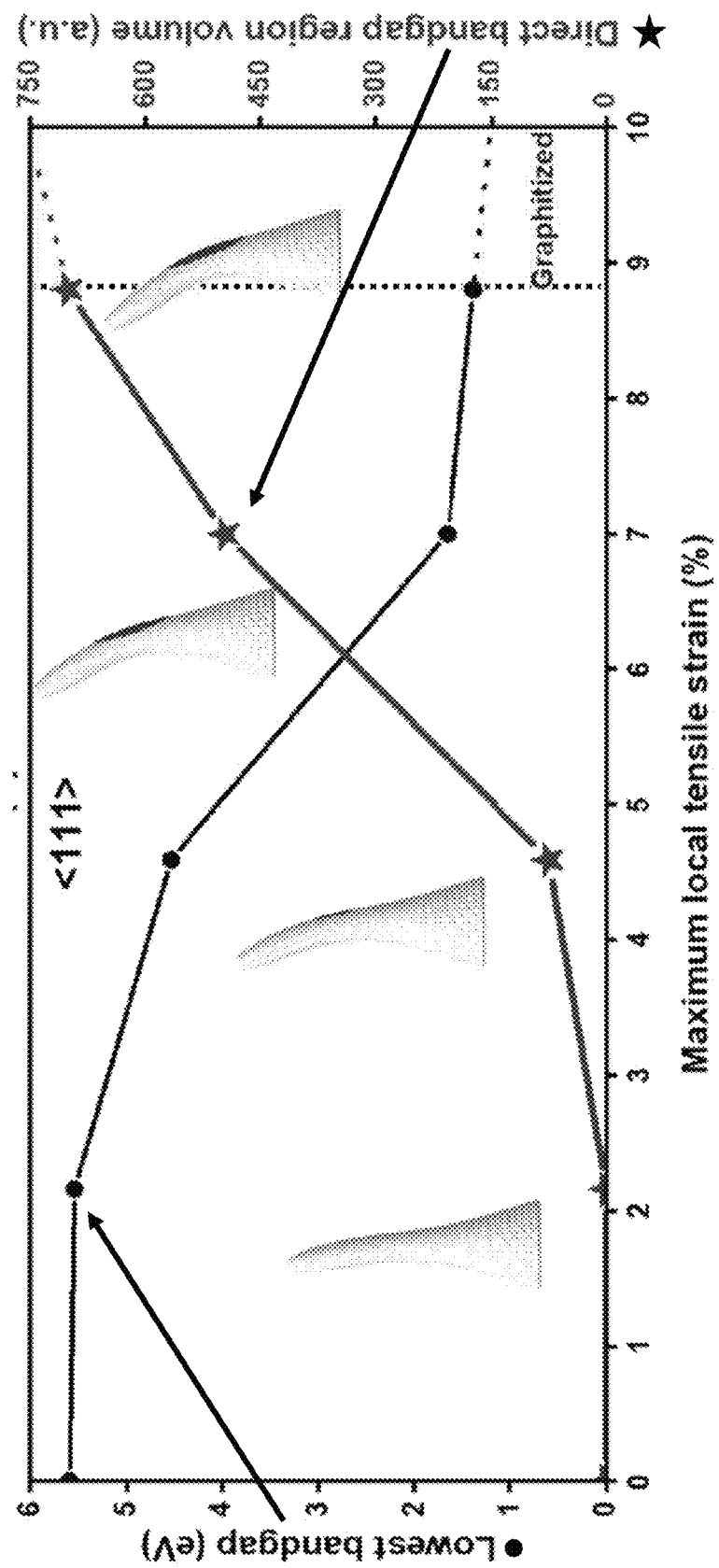
FIG. 17 presents a minimum electronic bandgap energy of exemplary nanoneedles and a volume of a direct bandgap region as a function of strain, according to some embodiments.

In the <111> oriented needles, these strain conditions further facilitate indirect-to-direct bandgap transitions in diamond. The spatial evolution of the "safe" direct bandgap regions (i.e., regions of the material associated with thermodynamically stable strains and direct bandgap transitions) in the nanoneedles can be found in FIG. 17. In particular, FIG. 17 presents the volume of the direct-bandgap region of a <111> oriented needle, indicated by star-shaped data points, alongside the minimum bandgap observed within the needle, indicated by circular data points. As expected, as strain increased, the volume of the direct bandgap region increased and the minimum electronic bandgap energy decreased until it reached a value near zero. The graphitized region indicated in the figure reflects the onset of phononic instability. It should, of course, be understood that although the approaches taken in this example were applied to undoped diamond, an identical approach can taken using defect doped diamond, as is described in later examples.

EXAMPLE 4

This example describes strain cases which yield a transition of nitrogen substitutional dopant from a deep dopant state to a shallow dopant state ($E_I$ no greater than several $k_BT$) in defect doped diamond. The nitrogen point defect ($N_c$) in diamond in an equilibrium (undeformed) state is bound to four carbon atoms (C-atoms) and has tetrahedral symmetry. There exists, however, a spontaneous symmetry breaking of the tetrahedral symmetry to one of four equivalent low-symmetry variants. In each symmetry variant, the nitrogen atom breaks a bond with one of the four C-atoms it is bound to and forms shorter bonds with the other three C-atoms. As a result, the nitrogen point defect is in a deep donor state that is ~2.2 eV below the conduction band edge. As such, the nitrogen point defect is impossible ionize by room-temperature thermal fluctuations and therefore will not contribute charge carriers to the conduction band.

Figure 18:
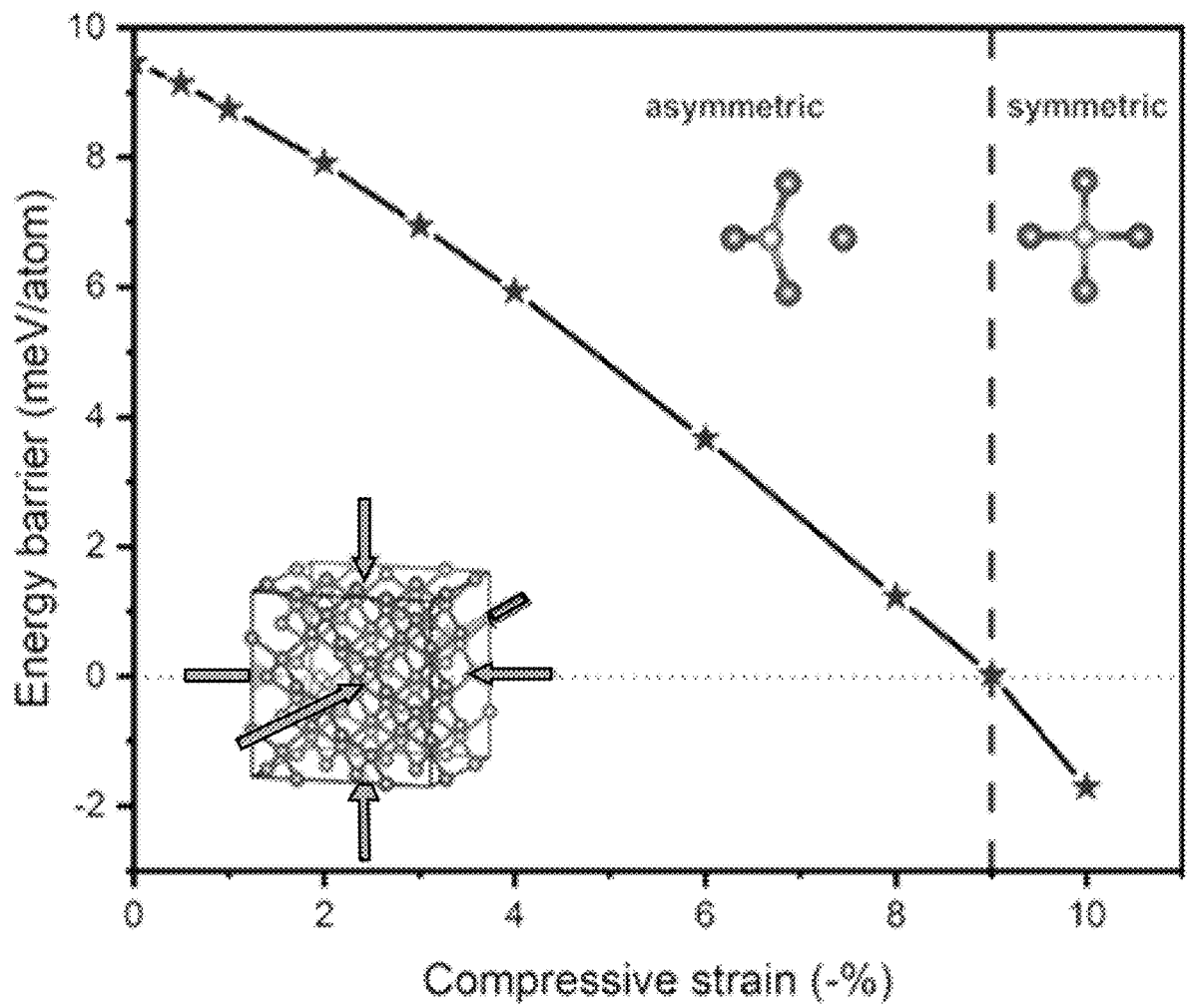
FIG. 18 presents an energy barrier associated with a transition of low-symmetry variants of a defect within an exemplary defect doped material as a function of strain, according to some embodiments.
Figure 19:
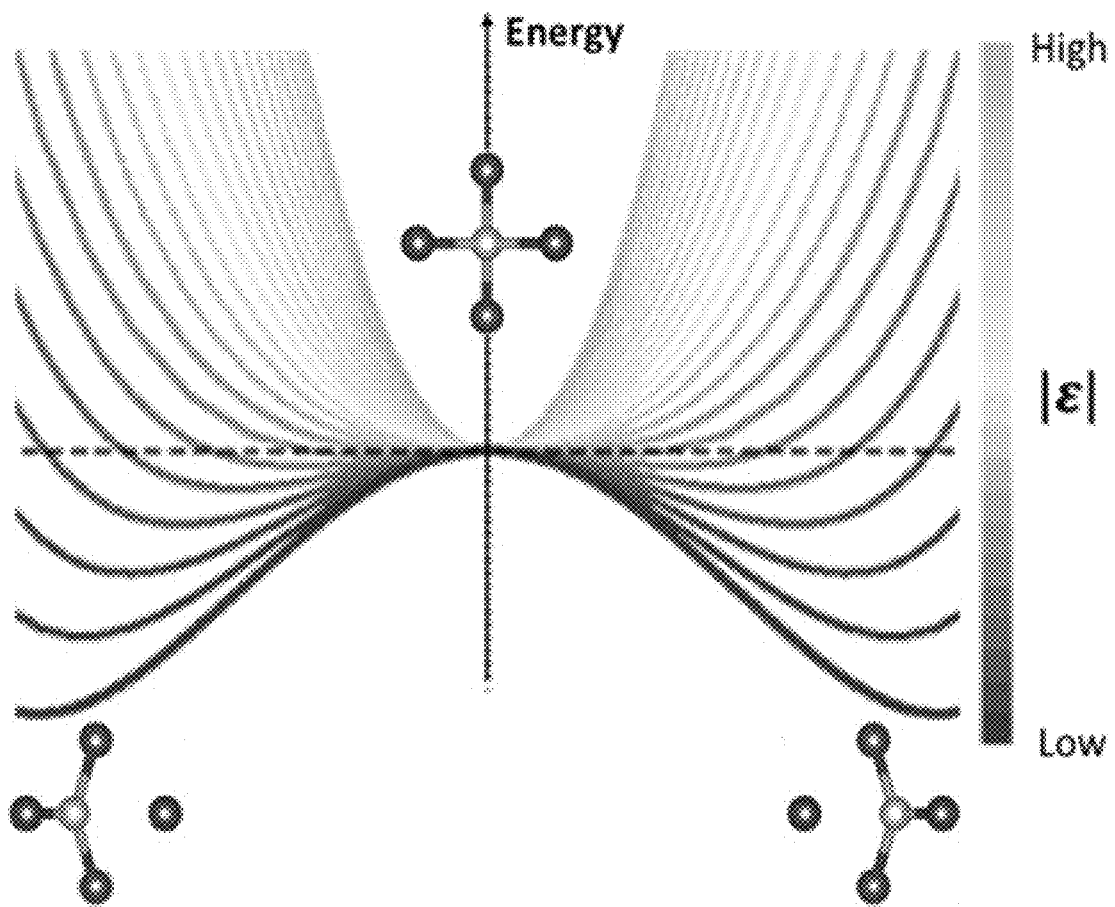
FIG. 19 presents energy of an exemplary defect doped material, as a function of its spatial configuration, according to some embodiments.
Figure 20:
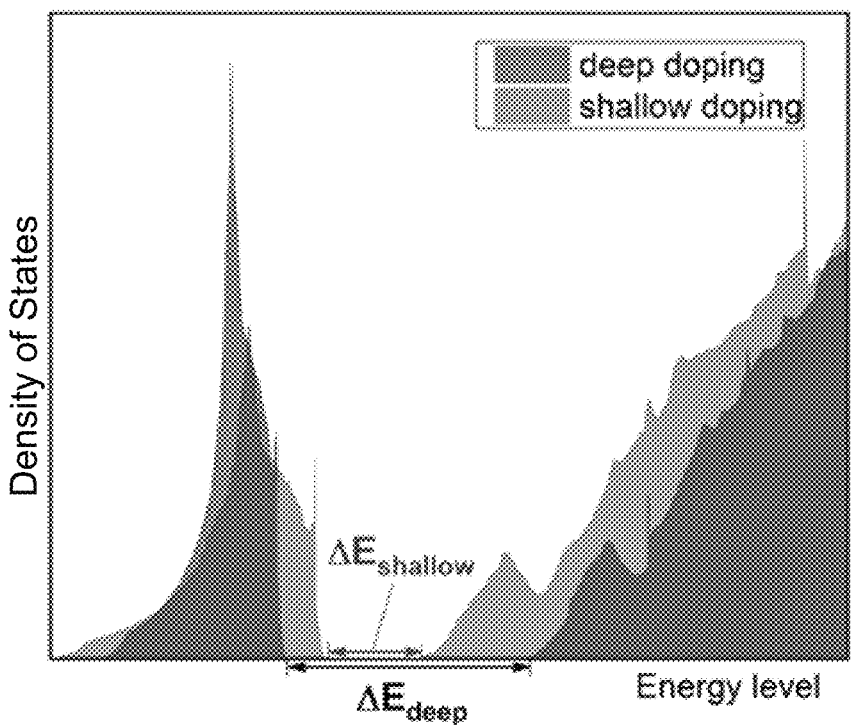
FIG. 20 presents a calculated DOS plot showing a reduction of defect ionization energy in an exemplary defect doped material, according to some embodiments.

In this simulated example, the defect doped diamond was elastically compressed by as much as 10% and the defect energy was analyzed using DFT. The DFT calculations reveal that under strain, the nitrogen defect structure changes. At low strains, the low-symmetry variants had lower energy than the symmetric variant, which formed an energy barrier between them. FIG. 18 shows, as strain is applied to the nitrogen-doped diamond, the N-atom gradually moves to the center of the tetrahedral site bounded by four other C-atoms, until the crystal is symmetric (when the energy barrier between symmetric states reaches zero). This process is further depicted in FIG. 19, which is a schematic plot of defect system energy as a function of the position of the nitrogen atom (x-axis) and the strain (indicated by the shade of each curve) from asymmetrical to symmetrical orientation for nitrogen-doped diamond. At low strain, the symmetric state presents an energy barrier between stable asymmetric states with lower energy. The application of a 10% hydrostatic compressive strain allows the energy barrier to vanish, which indicates the symmetric, tetrahedral structure is energetically stable. Applying a compressive strain to a region of diamond comprising a nitrogen point defect can therefore provide a transition to a shallower n-type dopant state. This result is also illustrated in FIG. 20, which presents a calculated DOS plot showing the retardation of defect ionization energy and realization of relatively shallower N dopant.

Figure 21:
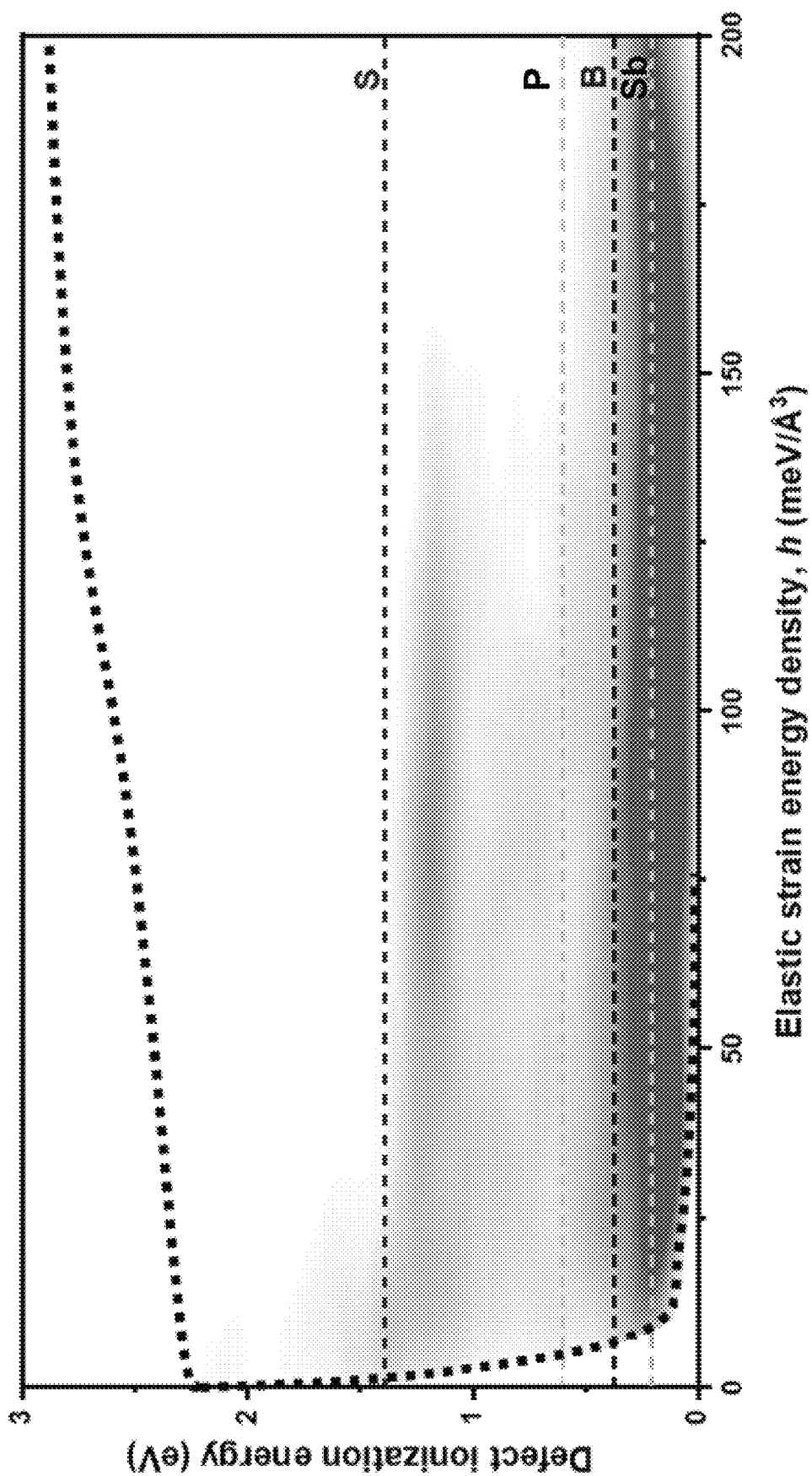
FIG. 21 presents a density of calculated defect ionization energies as a function of strain for an exemplary defect doped material, according to some embodiments.

To look for such a transition in the 6D strain hyperspace, a workflow similar to that in Example 1 was used to train a ML model that takes in a strain and predicts the ionization energy, $E_I1l$, of the defect. By plotting the resultant $E_I$ values against the elastic strain energy density (h), FIG. 21 was produced, illustrating that many strain pathways produce $N_c$ states with $E_I < k_B T$, meaning that they readily contribute delocalized electron carriers to the conduction band by thermal ionization. In FIG. 21, shading represents the density of ionization energy states for a given value of ionization energy at a given elastic strain energy density. The dashed curves indicate a boundary within which all observed ionization energies were located. The flat lines, labeled with S, P, B, and Sb, indicate the energy associated with unstrained substitutions of these elements (sulfur, phosphorous, boron, and antimony, respectively), which are included for reference. Because ionization energy varies significantly depending on the specific strain-state, broad bands of ionization energy are observed in FIG. 21 at a given strain energy density value. This demonstrates the importance of the specific strain-state for determining the ionization energy of a defect, highlighting the value of multiaxial strain-states for achieving desirable behavior in defect doped materials. Further, this example demonstrates the viability of the techniques described in Examples 1-3 for modeling defect doped materials, since FIG. 21 was generated using the same machine-learning approaches used to compute electronic bandgap energies in the preceding examples.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

What is claimed is:

1. An electrical device comprising:
    a defect doped material forming at least a portion of an electrical circuit; and
    one or more actuators configured to selectively apply a multiaxial strain to at least a first portion of the defect doped material, wherein the defect doped material is a non-conducting material when the defect doped material is in an unstrained state, and wherein at least a second portion of the defect doped material is a semiconducting material or a conducting material when the one or more actuators apply the multiaxial strain to the defect doped material in a strained state,
    wherein an activation energy to ionize defects of the defect doped material in the strained state is less than the activation energy to ionize the defects when the defect doped material is in the unstrained state.

2. The electrical device of claim 1, wherein at least two externally-applied mechanical forces applied to the defect doped material are substantially non-parallel.

3. The electrical device of claim 1, wherein the multiaxial strain is non-uniform in the defect doped material.

4. The electrical device of claim 1, wherein the multiaxial strain results from application of stress to a stress concentrator of the defect doped material.

5. The electrical device of claim 1, wherein the electrical device is configured to apply the multiaxial strain by translating two or more actuators in nonparallel directions.

6. The electrical device of claim 1, wherein the electrical circuit is configured to transmit current from a first electrode connected to the defect doped material to a second electrode connected to the defect doped material through the second portion of the defect doped material when the defect doped material is selectively strained by the one or more actuators.

7. The electrical device of claim 1, wherein the defect doped material is single-phase in the strained state.

8. The electrical device of claim 1, wherein the defect doped material is thermodynamically stable in the strained state.

9. The electrical device of claim 1, wherein the first portion comprises the second portion.

10. A composition comprising:
    a defect doped material, wherein a multiaxial strain is applied to at least a first portion of the defect doped material in a strained state, wherein the defect doped material is a non-conducting material when the defect doped material is in an unstrained state, and wherein at least a second portion of the defect doped material is a semiconducting material or a conducting material when the multiaxial strain is applied to the defect doped material,
    wherein an activation energy to ionize defects of the defect doped material in the strained state is less than the activation energy to ionize the defects when the defect doped material is in the unstrained state.

11. The composition of claim 10, wherein at least two externally-applied mechanical forces applied to the defect doped material are substantially non-parallel.

12. The composition of claim 10, wherein the multiaxial strain is non-uniform in the defect doped material.

13. The composition of claim 10, wherein the multiaxial strain results from application of stress to a stress concentrator of the defect doped material.

14. The composition of claim 10, wherein the defect doped material is single-phase in the strained state.

* * * * *